(12) United States Patent
Linck et al.

(10) Patent No.: US 11,993,031 B2
(45) Date of Patent: May 28, 2024

(54) CARBONIZATION SHAPE FORMING OF OXIDIZED PAN FIBER PREFORM

(71) Applicant: GOODRICH CORPORATION, Charlotte, NC (US)

(72) Inventors: John S. Linck, Pueblo, CO (US); Katherine E. Waugh, Easton, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/832,426

(22) Filed: Jun. 3, 2022

(65) Prior Publication Data

US 2022/0402220 A1  Dec. 22, 2022

Related U.S. Application Data

(60) Provisional application No. 63/212,264, filed on Jun. 18, 2021.

(51) Int. Cl.
| | | |
|---|---|---|
| *B29C 70/44* | (2006.01) | |
| *B29B 11/12* | (2006.01) | |
| *B29B 11/14* | (2006.01) | |
| *B29B 13/02* | (2006.01) | |
| *B29C 70/54* | (2006.01) | |
| *B29K 33/20* | (2006.01) | |

(52) U.S. Cl.
CPC .............. *B29C 70/44* (2013.01); *B29B 11/12* (2013.01); *B29B 11/14* (2013.01); *B29B 13/02* (2013.01); *B29C 70/541* (2013.01); *B29C 70/544* (2021.05); *B29K 2033/20* (2013.01)

(58) Field of Classification Search
None
See application file for complete search history.

(56) References Cited

U.S. PATENT DOCUMENTS

| | | |
|---|---|---|
| 1,394,558 A | 10/1921 | Klug |
| 1,916,435 A | 7/1933 | Ott et al. |
| 4,396,663 A | 8/1983 | Mitchell et al. |
| 5,433,937 A | 7/1995 | Sohda et al. |

(Continued)

FOREIGN PATENT DOCUMENTS

| | | | |
|---|---|---|---|
| DE | 4234002 A1 * | 4/1994 | ........... B29C 33/485 |
| DE | 4234002 | 6/1995 | |

(Continued)

OTHER PUBLICATIONS

European Patent Office, European Search Report dated Feb. 20, 2023 in Application No. 22179948.9.

(Continued)

*Primary Examiner* — Seyed Masoud Malekzadeh
*Assistant Examiner* — Timothy G Hemingway
(74) *Attorney, Agent, or Firm* — SNELL & WILMER L.L.P.

(57) ABSTRACT

A single stage OPF-to-carbon preform shape forming method includes positioning an oxidized PAN fiber preform with a female forming tool, positioning a vacuum bag over the oxidized PAN fiber preform, and vacuum forming the oxidized PAN fiber preform into a shaped body. The vacuum formed shaped body (while still in the shape forming fixture) may be loaded into a carbonization furnace and carbonized. The vacuum bag may be burned away in the carbonization furnace during carbonization.

9 Claims, 15 Drawing Sheets

(56) References Cited

U.S. PATENT DOCUMENTS

| | | | |
|---|---|---|---|
| 6,183,583 | B1 | 2/2001 | Duval et al. |
| 6,812,171 | B2 | 11/2004 | Shimazaki et al. |
| 7,198,739 | B2 | 4/2007 | La Forest et al. |
| 7,223,376 | B2 | 5/2007 | Panter et al. |
| 7,429,172 | B2 | 9/2008 | Chotard |
| 7,622,066 | B2 | 11/2009 | Brustad et al. |
| 8,673,188 | B2 | 3/2014 | Linck et al. |
| 8,864,073 | B1 | 10/2014 | Kim et al. |
| 9,017,761 | B2 | 4/2015 | La Forest et al. |
| 9,028,947 | B2 | 5/2015 | Tompkins et al. |
| 9,216,523 | B2 | 12/2015 | Monforte, II et al. |
| 9,259,859 | B2 | 2/2016 | Blackburn et al. |
| 9,546,438 | B2 | 1/2017 | Fiala |
| 9,638,048 | B2 | 5/2017 | Measom et al. |
| 9,873,231 | B2 | 1/2018 | Le Costaouec |
| 10,011,534 | B2 * | 7/2018 | Hipp ............... B29B 11/16 |
| 10,427,807 | B1 | 10/2019 | Stackpoole et al. |
| 10,457,016 | B2 | 10/2019 | La Forest et al. |
| 10,746,246 | B2 | 8/2020 | Fryska et al. |
| 2003/0168555 | A1 | 9/2003 | Livi et al. |
| 2004/0115300 | A1 | 6/2004 | Zuffa |
| 2005/0093188 | A1 | 5/2005 | Forest et al. |
| 2006/0073338 | A1 | 4/2006 | Simpson et al. |
| 2008/0292739 | A1 | 11/2008 | Kashikar et al. |
| 2010/0074979 | A1 | 3/2010 | Cundiff et al. |
| 2017/0008266 | A1 * | 1/2017 | Humfeld ............ B29C 70/44 |
| 2017/0268102 | A1 | 9/2017 | She et al. |
| 2018/0326627 | A1 * | 11/2018 | Ichiki ................. B32B 5/08 |
| 2019/0134848 | A1 | 5/2019 | Podgorski et al. |
| 2019/0240876 | A1 * | 8/2019 | Lee .................... B29C 70/44 |
| 2020/0282669 | A1 | 9/2020 | Wade et al. |
| 2020/0346419 | A1 | 11/2020 | Rigamonti |
| 2020/0398460 | A1 | 12/2020 | Davidson et al. |
| 2021/0187787 | A1 | 6/2021 | Cebolla Garrofe |

FOREIGN PATENT DOCUMENTS

| | | | | |
|---|---|---|---|---|
| DE | 102012024060 | | 6/2014 | |
| DE | 202016100796 | | 5/2017 | |
| DE | 102016101610 | | 8/2017 | |
| EP | 770155 | | 7/2000 | |
| EP | 2225093 | | 1/2012 | |
| EP | 3211362 | | 1/2021 | |
| FR | 2871092 | | 12/2005 | |
| GB | 1265552 | | 3/1972 | |
| GB | 2535193 | A * | 8/2016 | ............ B29C 35/02 |
| JP | H03223177 | | 10/1991 | |
| JP | 2016043507 | | 4/2016 | |
| KR | 100730775 | | 6/2007 | |
| WO | WO-2005070642 | A1 * | 8/2005 | ............ B23C 33/38 |
| WO | 2019012242 | | 1/2019 | |
| WO | WO-2019012242 | A1 * | 1/2019 | ........... B29C 37/005 |

OTHER PUBLICATIONS

USPTO; Requirement for Restriction dated Mar. 14, 2023 in U.S. Appl. No. 17/832,485.

USPTO; Non-Final Office Action dated Jun. 23, 2023 in U.S. Appl. No. 17/832,459.

Fujita, Akihiro, Hiroyuki Hamada, and Zenichiro Maekawa. "Tensile Properties of Carbon Fiber Triaxial Woven Fabric Composites." Journal of composites materials 27.15 (1993): 1428-1442. Web (Year: 1993).

USPTO; Requirement for Restriction dated Jul. 19, 2023 in U.S. Appl. No. 17/832,403.

USPTO; Non-Final Office Action dated Jul. 19, 2023 in U.S. Appl. No. 17/832,485.

European Patent Office, European Partial Search Report dated Nov. 18, 2022 in Application No. 22179948.9.

European Patent Office, European Search Report dated Oct. 31, 2022 in Application No. 22179944.8.

European Patent Office, European Search Report dated Nov. 17, 2022 in Application No. 22179985.1.

European Patent Office, European Search Report dated Oct. 27, 2022 in Application No. 22179728.5.

USPTO; Final Office Action dated Dec. 18, 2023 in U.S. Appl. No. 17/832,459.

USPTO; Non-Final Office Action dated Oct. 25, 2023 in U.S. Appl. No. 17/832,403.

USPTO; Final Office Action dated Nov. 15, 2023 in U.S. Appl. No. 17/832,485.

USPTO; Final Office Action dated Feb. 14, 2024 in U.S. Appl. No. 17/832,403.

* cited by examiner

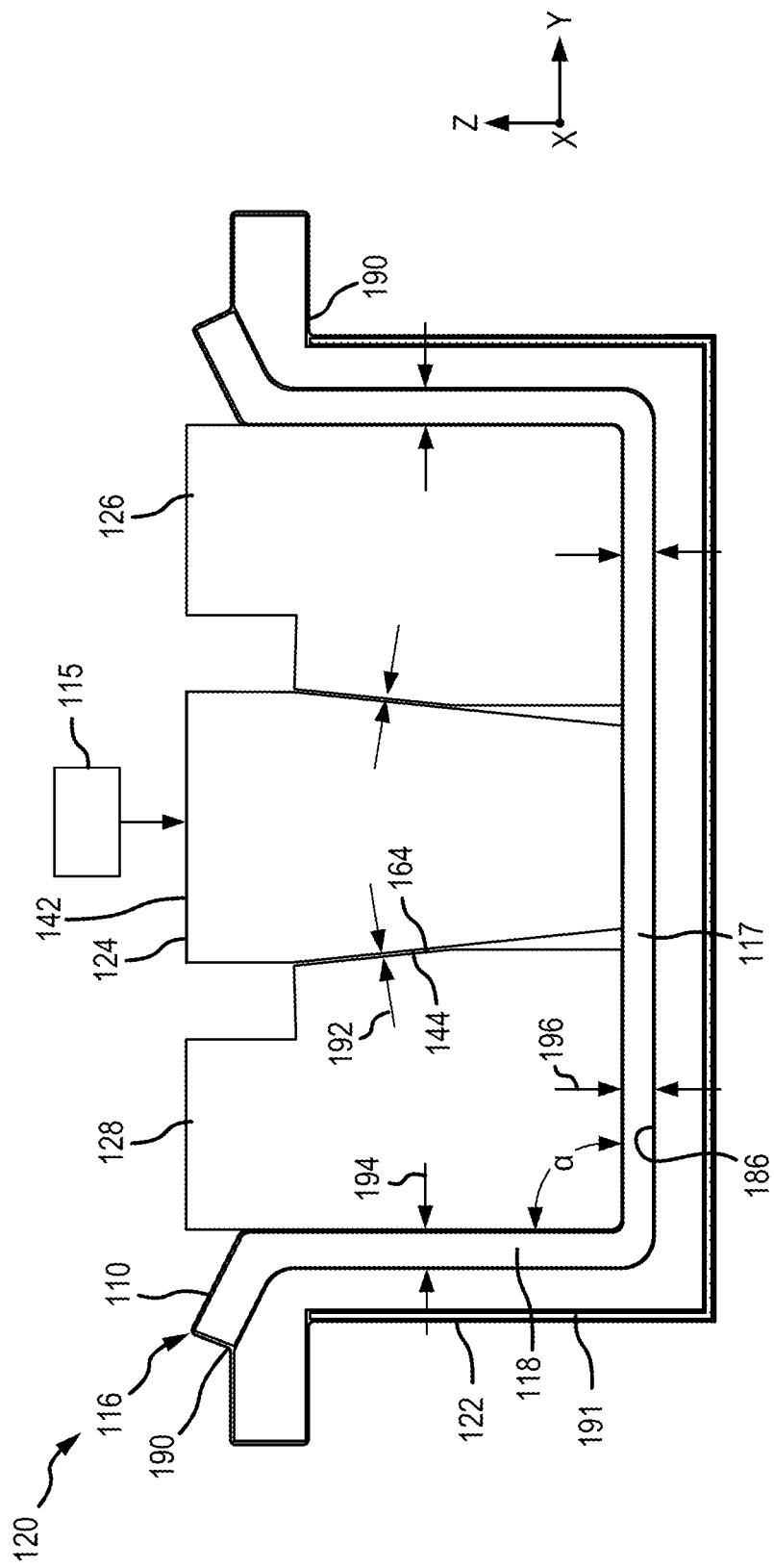

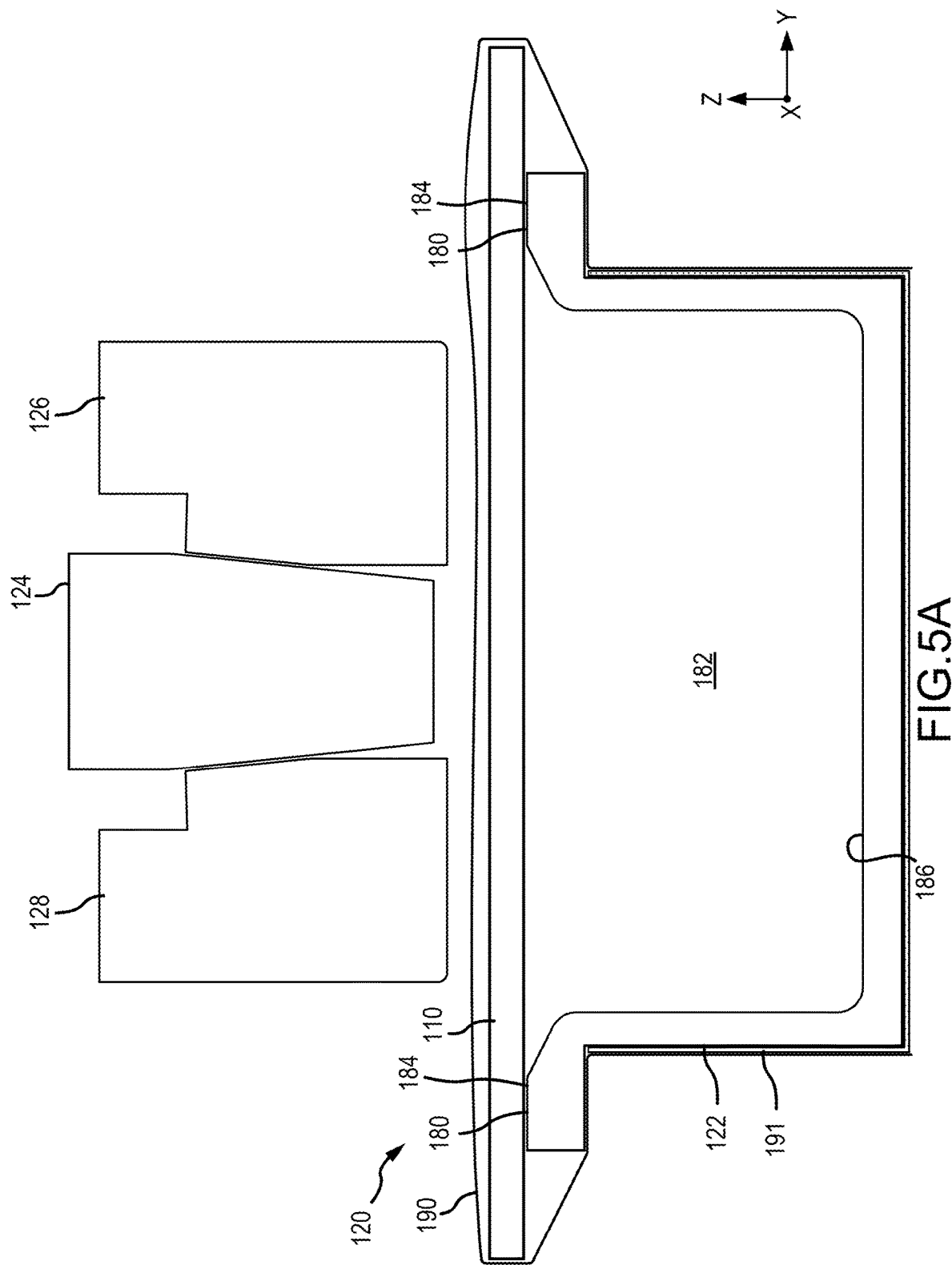

CARBONIZATION SHAPE FORMING OF OXIDIZED PAN FIBER PREFORM

CROSS REFERENCE TO RELATED APPLICATIONS

This application claims priority to, and the benefit of, U.S. Provisional Patent Application Ser. No. 63/212,264, entitled "SHAPE FORMING NON-WOVEN OPF PREFORM," filed on Jun. 18, 2021. The '264 application is hereby incorporated by reference in its entirety for all purposes.

FIELD

The present disclosure relates to carbon/carbon composites, and more specifically, to systems and methods for manufacturing carbon/carbon (C/C) composites.

BACKGROUND

Composite bodies are utilized in various industries, including the aerospace industry. C/C composites are often produced as 2D structures, for example utilizing planar oxidized polyacrylonitrile (PAN) fiber-based preforms followed by carbonization and chemical vapor infiltration (CVI) densification.

SUMMARY

According to various embodiments, a method for manufacturing a C/C part is disclosed, the method comprising positioning an oxidized PAN fiber preform with a female forming tool, the female forming tool comprising a die recess, positioning a vacuum bag over the oxidized PAN fiber preform, forming the oxidized PAN fiber preform into a shaped body, loading the female forming tool and the shaped body into a carbonization furnace, and carbonizing the shaped body with the carbonization furnace. The forming comprises evacuating air from between the vacuum bag and the female forming tool to press the oxidized PAN fiber preform against the die recess of the female forming tool with the vacuum bag.

In various embodiments, the vacuum bag is burned away in the carbonization furnace during the carbonization process.

In various embodiments, the forming further comprises moving a first plug at least partially into the die recess and over the vacuum bag, the oxidized PAN fiber preform disposed between the first plug and the female forming tool, moving a second plug at least partially into the die recess and over the vacuum bag, the oxidized PAN fiber preform disposed between the second plug and the female forming tool, and moving a wedge between and against the first plug and the second plug along a first axis. In response to the wedge pressing between and against the first plug and the second plug, the first plug and the second plug move along a second axis substantially perpendicular to the first axis. In response to moving the first plug and the second plug along the second axis, the oxidized PAN fiber preform and the vacuum bag are compressed between the first plug and the female forming tool and between the second plug and the female forming tool.

In various embodiments, movement of the wedge along the first axis further causes the first plug and the second plug to move parallel to the first axis.

In various embodiments, the method further comprises positioning a dowel at least partially into a dowel recess disposed in the oxidized PAN fiber preform, and positioning the dowel at least partially into a slots disposed in the female forming tool to secure at least a portion of the oxidized PAN fiber preform with respect to the female forming tool.

In various embodiments, the method further comprises compressing a lateral end of the oxidized PAN fiber preform between an external load and a top side of the female forming tool.

In various embodiments, the method further comprises applying water to the oxidized PAN fiber preform.

In various embodiments, the carbonizing the shaped body with the carbonization furnace comprises heating the oxidized PAN fiber preform in the carbonization furnace to a carbonization temperature of between 1,200° C. and 2400° C. (2,192° F. to 4,352° F.).

According to various embodiments, a method for manufacturing a C/C part is disclosed, the method comprising positioning an oxidized PAN fiber preform with a female forming tool, the female forming tool comprising a die recess, positioning a vacuum bag over the oxidized PAN fiber preform, forming the oxidized PAN fiber preform into a shaped body by evacuating air from between the vacuum bag and the female forming tool to press the oxidized PAN fiber preform against the female forming tool with the vacuum bag, moving a first plug at least partially into the die recess and over the vacuum bag, the oxidized PAN fiber preform disposed between the first plug and the female forming tool, moving a second plug at least partially into the die recess and over the vacuum bag, the oxidized PAN fiber preform disposed between the second plug and the female forming tool, moving a wedge between and against the first plug and the second plug along a first axis, loading the female forming tool and the shaped body into a carbonization furnace, placing an external load on top of the wedge, the external load biasing the wedge toward the female forming tool, and carbonizing the shaped body with the carbonization furnace.

In various embodiments, the vacuum bag is burned away in the carbonization furnace during the carbonizing.

In various embodiments, the vacuum bag completely encapsulates the female forming tool.

A shape forming tool is disclosed, comprising a female forming tool comprising a die recess, a vacuum bag configured to at least partially surround the female forming tool, a first plug configured to be received by the die recess and over a first portion of the vacuum bag, a second plug configured to be received by the die recess and over a second portion of the vacuum bag, and a wedge configured to be received by the die recess between the first plug and the second plug. The wedge extends longitudinally along a longitudinal centerline of the wedge between and to a first end of the wedge and a second end of the wedge. The wedge extends laterally between and to a first side of the wedge and a second side of the wedge. The first side of the wedge comprises a first tapered surface and the second side of the wedge comprises a second tapered surface. The first tapered surface of the wedge is configured to engage the first plug and the second tapered surface of the wedge is configured to engage the second plug. In response to the first tapered surface of the wedge engaging the first plug, the first plug is configured to move laterally toward a first side of the female forming tool. In response to the second tapered surface of the wedge engaging the second plug, the second plug is configured to move laterally toward a second side of the female forming tool.

In various embodiments, the shape forming tool further comprises a breather cloth configured to be disposed between the female forming tool and the vacuum bag.

In various embodiments, the vacuum bag completely encapsulates the die recess of the female forming tool. In various embodiments, the vacuum bag completely encloses the die recess of the female forming tool without completely encapsulating the entire female forming tool.

In various embodiments, the die recess is configured without any sharp corners or sharp transitions.

In various embodiments, the first plug comprises a first angled surface configured to engage the first tapered surface of the wedge, and the second plug comprises a second angled surface configured to engage the second tapered surface of the wedge.

In various embodiments, the first tapered surface comprises a guide flange protruding therefrom, and the first angled surface comprises a guide slot configured to receive the guide flange for maintaining a longitudinal position and a rotational position of the first plug with respect to the wedge.

In various embodiments, the shape forming tool further comprises an external load configured to compress an end of a fibrous preform between the external load and a top side of the female forming tool.

In various embodiments, the female forming tool, the wedge, the first plug, and the second plug comprise a graphite material.

In various embodiments, a total height of the wedge, measured along a vertical direction, is equal to that of the first plug and the second plug.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 1B is a schematic sectional illustration of the system of FIG. 1A with its wedge moved so that its top surface is flush with that of the first and second plugs (in a closed position), in accordance with various embodiments;

FIG. 5A is a schematic sectional view of the shape forming system with its wedge and plugs in an open position and a vacuum bag before air is evacuated from within the vacuum bag, in accordance with various embodiments;

DETAILED DESCRIPTION

Figure 1A:
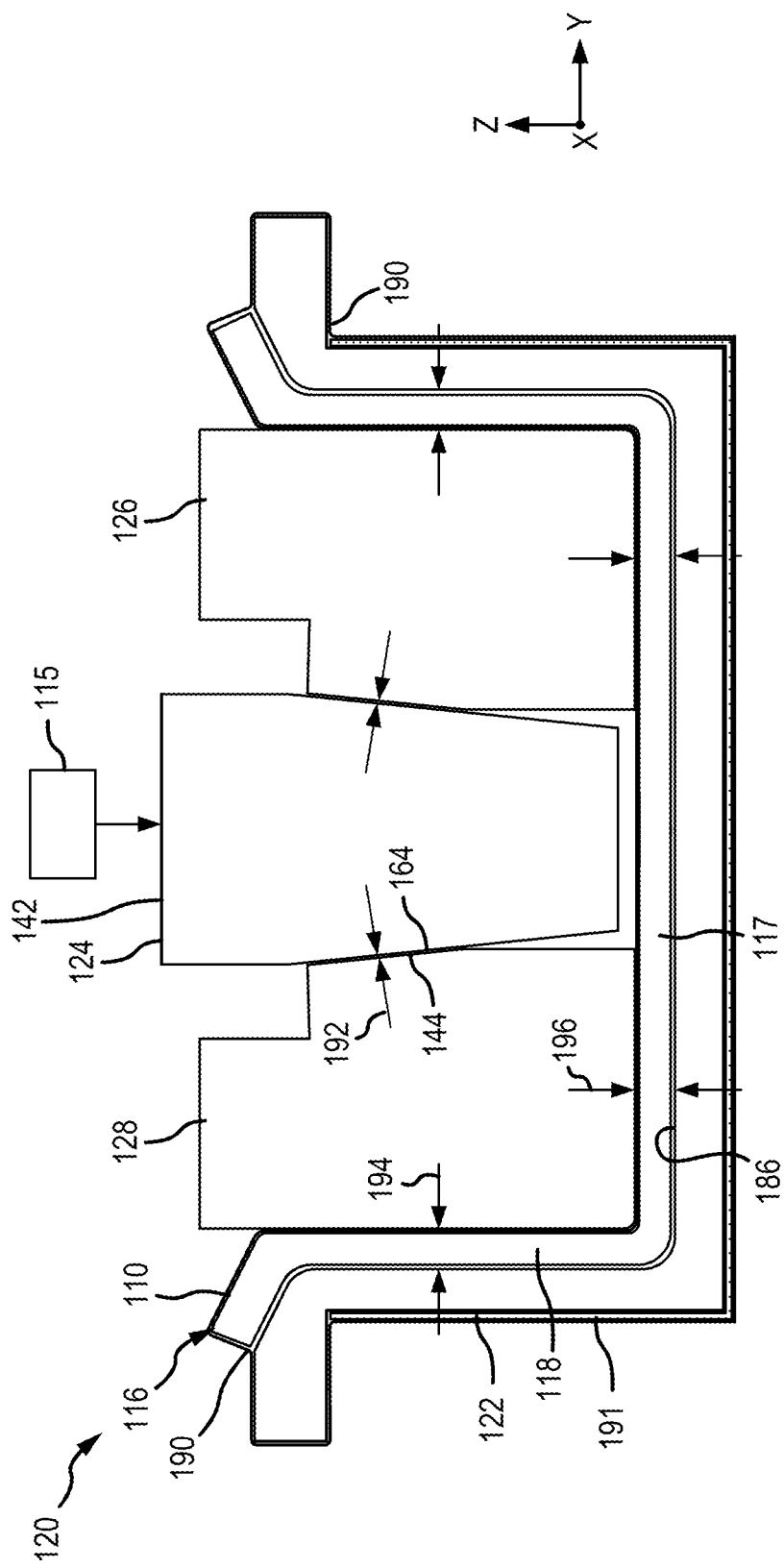
FIG. 1A is a schematic sectional illustration of a shape forming system for carbonization compression and shaping a fibrous preform into a shaped body with its wedge applying compression forces to its first and second plugs (in a closed or partially closed position), in accordance with various embodiments.

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the term "fiber density" is used with its common technical meaning with units of g/cm$^3$ or g/cc. The fiber density may refer specifically to that of the individual fibers in the fibrous preform. The density will be measured, unless otherwise noted, by taking the weight divided by the geometric volume of each fiber. The density may refer to an average density of a plurality of fibers included in a fibrous preform.

As used herein, "CVI/CVD" may refer to chemical vapor infiltration and/or chemical vapor deposition. Accordingly, CVI/CVD may refer to chemical vapor infiltration or deposition or both.

In general, there are currently two primary methods of manufacturing carbon/carbon ("C/C") materials. The first method involves the layup and cure of a carbon fiber, phenolic resin matrix composite, followed by pyrolysis and subsequent phenolic resin infiltration and pyrolysis cycles. Multiple resin infiltration, cure, and pyrolysis cycles are typically used until the part achieves the desired density. The second method involves fabrication of an oxidized polyacrylonitrile fiber (OPF) or carbon fiber preform, followed by carbonization (for OPF preforms) and chemical vapor infiltration (CVI) densification. The chemical vapor infiltration cycles are continued, in conjunction with machining the preform between infiltration cycles if desired, until the desired part density is achieved. Combinations of these two basic process methods are also in use and may include variations in preform architecture, infiltration resin type, and chemical vapor infiltration conditions. A third method may involve a combination of the two aforementioned processes including layup and cure of a carbon fiber, phenolic resin matrix composite, followed by pyrolysis, and CVI densification.

After a fibrous OPF preform (also referred to herein as a fibrous preform) is made, it is carbonized to convert the OPF into carbon fibers. Typically, fibrous preforms are carbonized by placing the preforms in a furnace with an inert atmosphere. As is well-understood, the heat of the furnace causes a chemical conversion which drives off the non-carbon chemical species from the preform. The resulting preform generally has the same fibrous structure as the fibrous preform before carbonizing. However, the OPF have been converted to 100%, or nearly 100%, carbon. After the preform has been carbonized, the preform is densified. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases into the furnace and around and through the fibrous preforms. As a result, carbon from the hydrocarbon gases separates from the gases and is deposited on and within the fibrous preforms. When the densification step is completed, the resulting C/C part has a carbon fiber structure with a carbon matrix infiltrating the fiber structure, thereby deriving the name "carbon/carbon".

C/C parts of the present disclosure are formed using OPF fabrics that are shape-formed prior to carbonization. C/C parts of the present disclosure may be formed using multi-axial, non-crimp, stich-bonded, OPF fabrics that are shape-formed prior to carbonization. C/C parts of the present disclosure may be particularly useful for high temperature aerospace applications, such as for re-entry vehicle applications or other high temperature applications such as where a hot gas impinges on the vehicle after being rapidly compressed and heated as a result of a high pressure bow shock in front of the vehicle. C/C parts of the present disclosure may be especially useful in these applications because of the superior high temperature characteristics of C/C material. In particular, the carbon/carbon material used in C/C parts is a good conductor of heat and is able to dissipate heat generated during high temperature conditions. Carbon/carbon material is also highly resistant to heat damage, and thus, may be capable of sustaining forces during severe conditions without mechanical failure.

Application of OPF-based carbon-carbon composites has been generally limited to simple flat structures including C/C aircraft brake disks. C/C components including leading edges, structural members, and other contour-shape carbon composites are often produced as 2D structures (i.e., flat, planar components); however, these materials tend to maintain low interlaminar properties. A shape formed 3D C/C part offers opportunity for similar in-plane C/C properties with higher interlaminar properties than 2D C/C.

With reference to FIG. 1A and FIG. 1B, a shape forming tool 120 (also referred to as a fixture) for compressing and shaping a fibrous preform 110 is illustrated, in accordance with various embodiments. Shape forming tool 120 may be used for both pre-carbonization compression as well as compression during carbonization. Shape forming tool 120 may be configured for forming a shaped fibrous preform 110 from a multi-layered preform; e.g., a stack of a plurality of layers of material. Shape forming tool 120 may include a multi-component wedge-based press fixture comprising a female forming tool 122 and a multi-piece wedge and plug arrangement comprising a wedge 124, a first plug 126, and a second plug 128. This wedge-and-plug tooling design allows the shape forming tool 120 to have enough flexibility to maintain pressure application on the side walls of the fibrous preform 110 as the thickness of the material decreases during the pre-carbonization compression process as well as during the carbonization process. In various embodiments, as described in greater detail herein, the design may utilize angled flanges to keep the wedges and plugs aligned together as the tooling pushes down on the fibrous preform 110 and into the female forming tool 122. In various embodiments, female forming tool 122, wedge 124, first plug 126, and second plug 128 are made from a graphite material or a machined carbon/carbon material suitable for withstanding elevated temperatures experienced during carbonization and densification processes.

Figure 2:
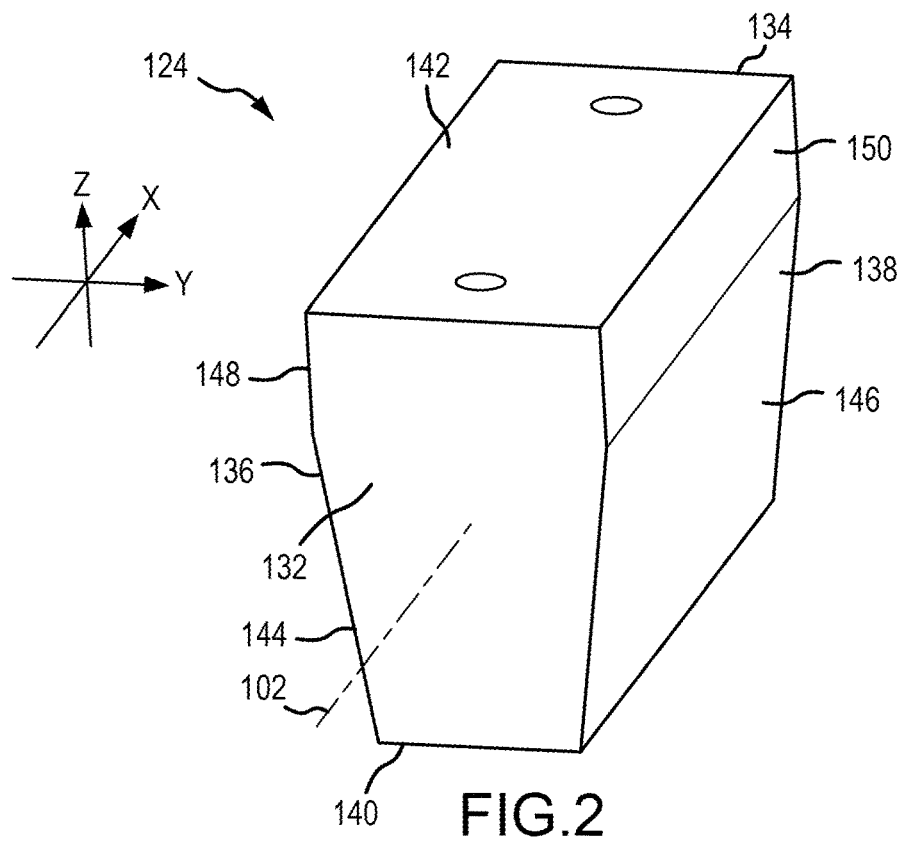
FIG. 2 is a perspective illustration of a wedge, in accordance with various embodiments.

With reference to FIG. 2, the wedge 124 extends longitudinally along a longitudinal centerline 102 of the wedge 124 (e.g., along an X-axis) between and to a first end 132 of the wedge 124 and a second end 134 of the wedge 124. The wedge 124 extends laterally (e.g., along a Y-axis) between and to a first side 136 of the wedge 124 and a second side 138 of the wedge 124. The wedge 124 extends vertically (e.g., along a Z-axis) between and to a bottom side 140 of the wedge 124 and a top side 142 of the wedge 124.

The wedge 124 is configured with a wedge-shaped geometry; e.g., the first side 136 comprises a first angled surface 144 (also referred to herein as a first tapered surface) and the second side 138 comprises a second angled surface 146 (also referred to herein as a second tapered surface) such that the wedge 124 is tapered toward the bottom side 140. In various embodiments, the first side 136 further comprises a first vertical surface 148 and the second side 138 comprises a second vertical surface 150 such that the wedge 124. The first angled surface 144 may intersect with the first vertical surface 148 at a horizontally extending (e.g., along the X-axis) interface. The second angled surface 146 may intersect with the second vertical surface 150 at a horizontally extending (e.g., along the X-axis) interface.

Figure 3:
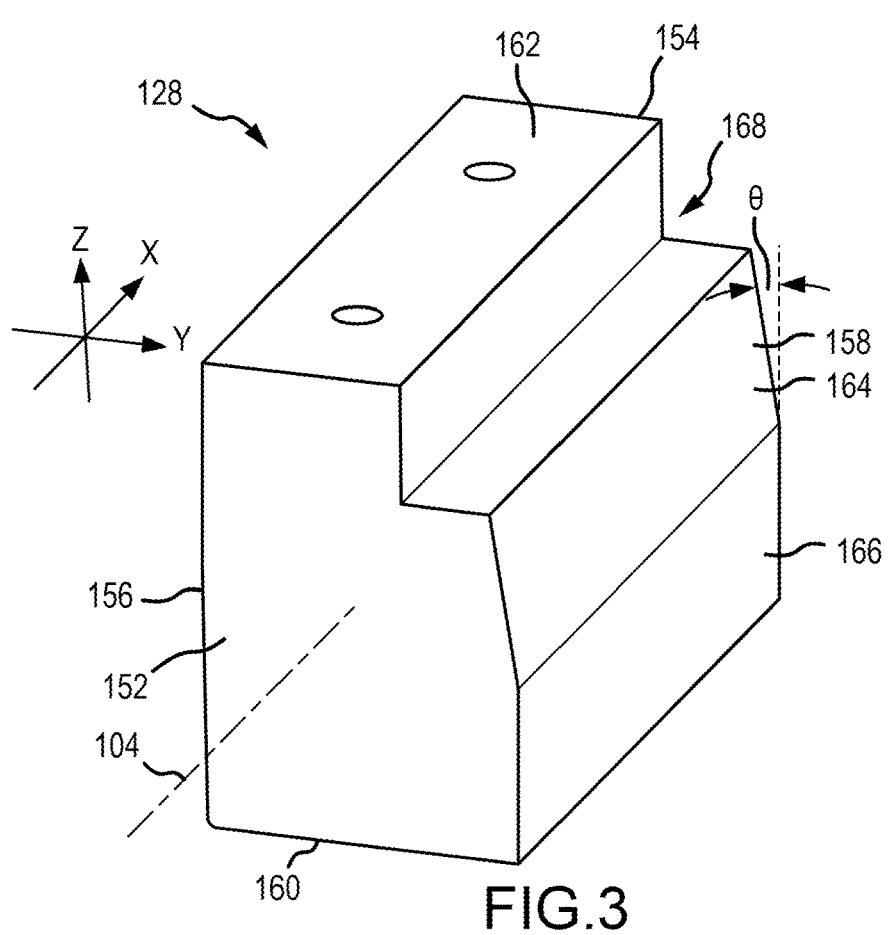
FIG. 3 is a perspective illustration of a plug, in accordance with various embodiments.

With reference to FIG. 3, the second plug 128 extends longitudinally along a longitudinal centerline 104 of the second plug 128 (e.g., along an X-axis) between and to a first end 152 of the wedge 124 and a second end 154 of the second plug 128. The second plug 128 extends laterally (e.g., along a Y-axis) between and to a first side 156 of the second plug 128 and a second side 158 of the second plug 128. The second plug 128 extends vertically (e.g., along a Z-axis) between and to a bottom side 160 of the second plug 128 and a top side 162 of the second plug 128.

In various embodiments, the first side 156 is shaped to conform to a geometry of a side surface of the female forming tool 122. In various embodiments, the first side 156 comprises a vertical surface. However, first side 156 may be at an angle with respect to a vertical direction depending on the desired shape of the final C/C part. The second side 158 may comprise an angled surface 164 configured to engage (e.g., directly contact) first angled surface 144 whereby preform compressing forces (represented by arrows 192 in FIG. 1A)—e.g., in response to wedge 124 moving downward (e.g., in the negative Z-direction)—are transmitted therebetween for moving the second plug 128 in the lateral direction (e.g., along the Y-axis) to compress (e.g., see compression forces represented by arrows 194 in FIG. 1A) a sidewall 118 of the fibrous preform 110. The preform compressing force 192 transmitted between wedge 124 and second plug 128 may further move the second plug 128 in the vertical direction (e.g., in the negative Z-direction) to compress (e.g., see compression forces represented by arrows 196 in FIG. 1A) a bottom wall 117 of the fibrous preform 110. Angled surface 164 may be oriented at a non-parallel angle θ with respect to the vertical direction (e.g., the Z-direction). In various embodiments, a vertical surface 166 extends vertically between and to bottom side 140 and angled surface 164. In various embodiments, a step 168 is formed into the second plug 128. Step 168 may extend between and to angled surface 164 and top side 162. The first plug 126 may be structurally similar to the second plug 128. The first plug 126 may exhibit a mirrored geometry with that of the second plug 128.

Figure 6:
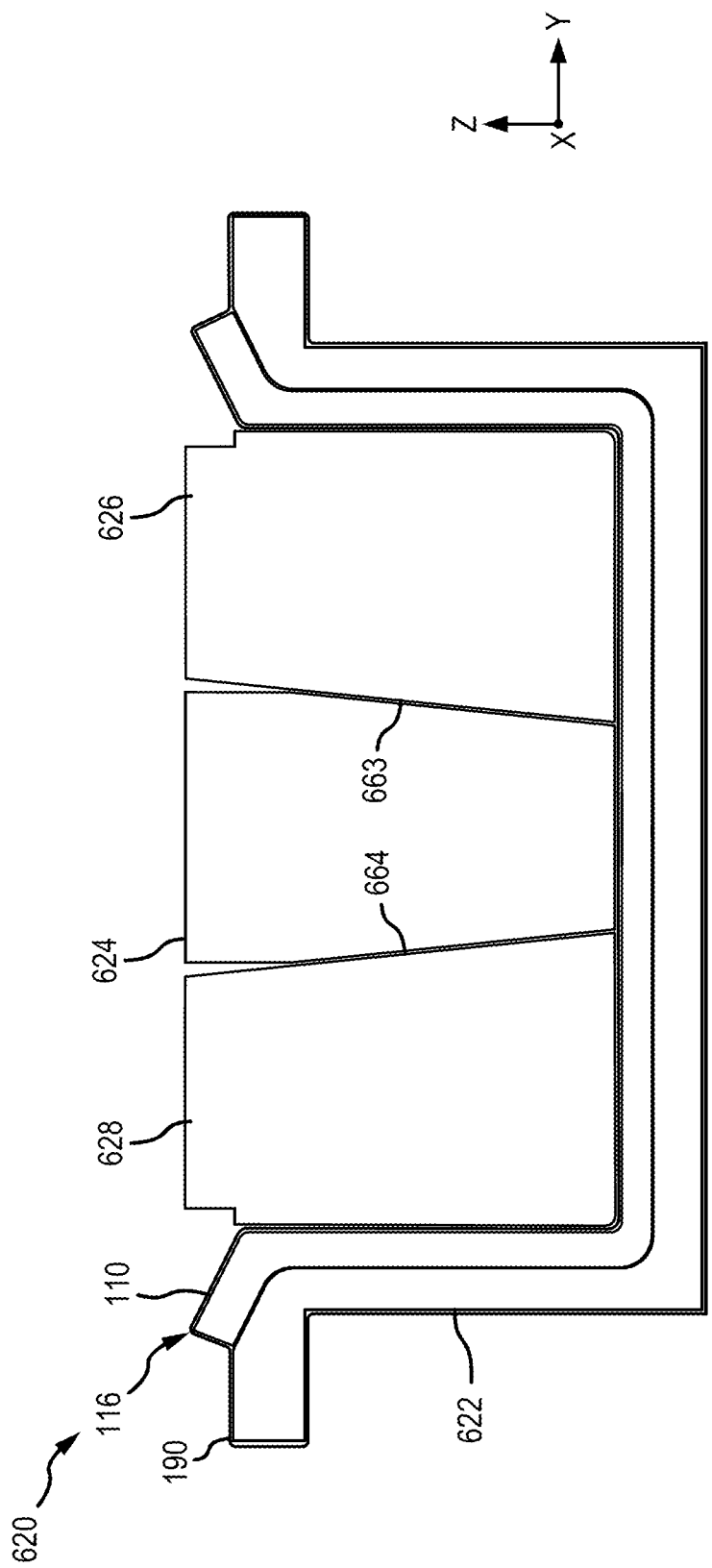
FIG. 6 is a schematic sectional illustration of a shape forming system with plugs having angled surfaces extending between and to bottom and top surfaces thereof, in accordance with various embodiments.

Although illustrated as extending between and to the step 168 and the vertical surface 166, it is further contemplated that angled surface 164 may extend between and to the top side 162 and the bottom side 160 of second plug 128. In this regard, step 168 and vertical surface 166 may be omitted in various embodiments. For example, with momentary reference to FIG. 6, a shape forming tool 620 is illustrated with a female forming tool 622, a wedge 624, a first plug 626, and a second plug 628. The angled surface 663 of the first plug 626 and the angled surface 664 of the second plug 628 extend between and to the top side and the bottom side of first plug 626 and the second plug 628, respectively. The first plug 126 and second plug 128 of FIG. 1A through FIG. 12B may be shaped similar to first plug 626 and second plug 628, respectively, in various embodiments. With respect to FIG. 6, elements with like element numbering, as depicted in FIG. 1A, are intended to be the same and will not necessarily be repeated for the sake of clarity.

Figure 4:
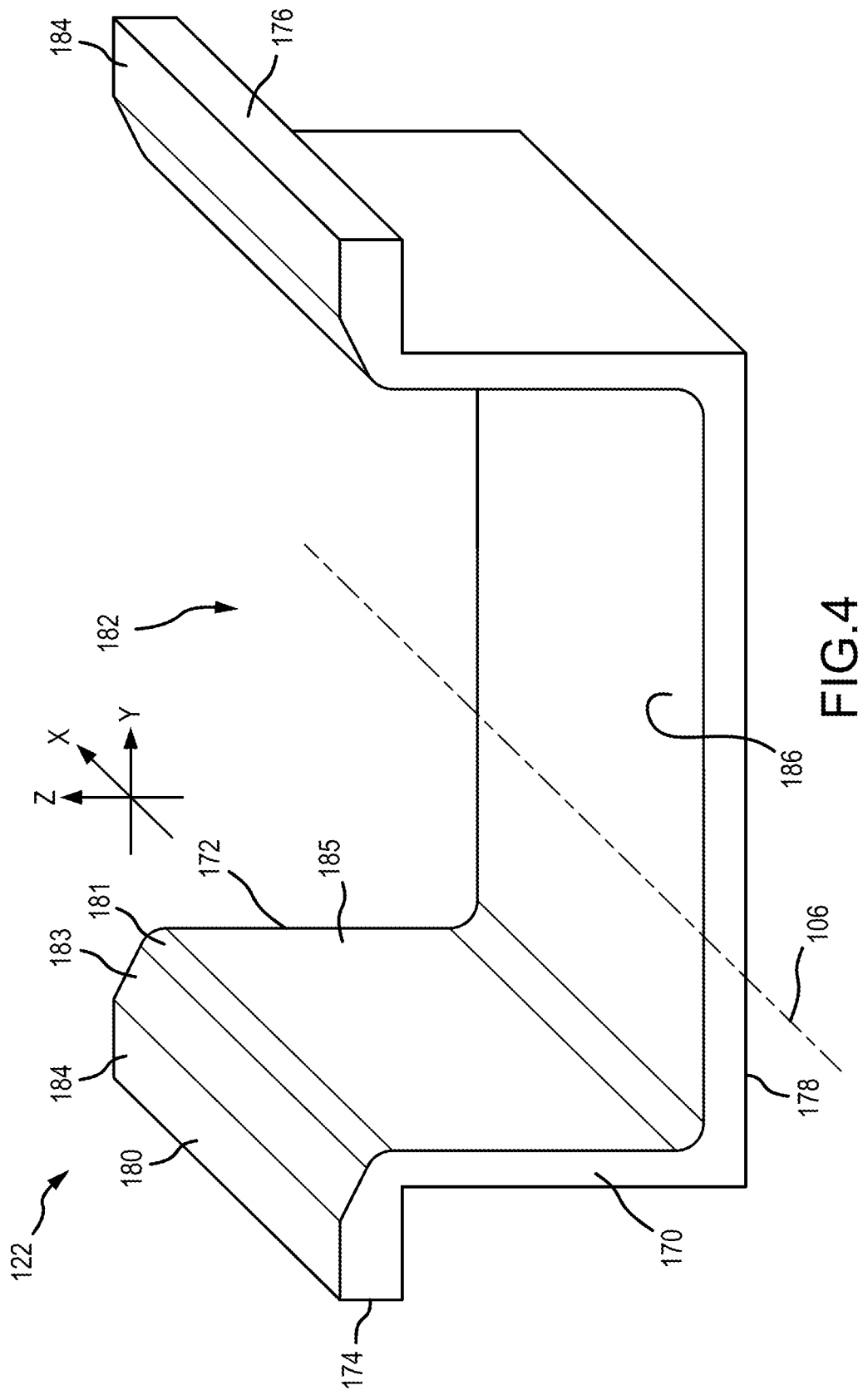
FIG. 4 is a perspective illustration of a female forming tool (a female die), in accordance with various embodiments.
Figure 5B:
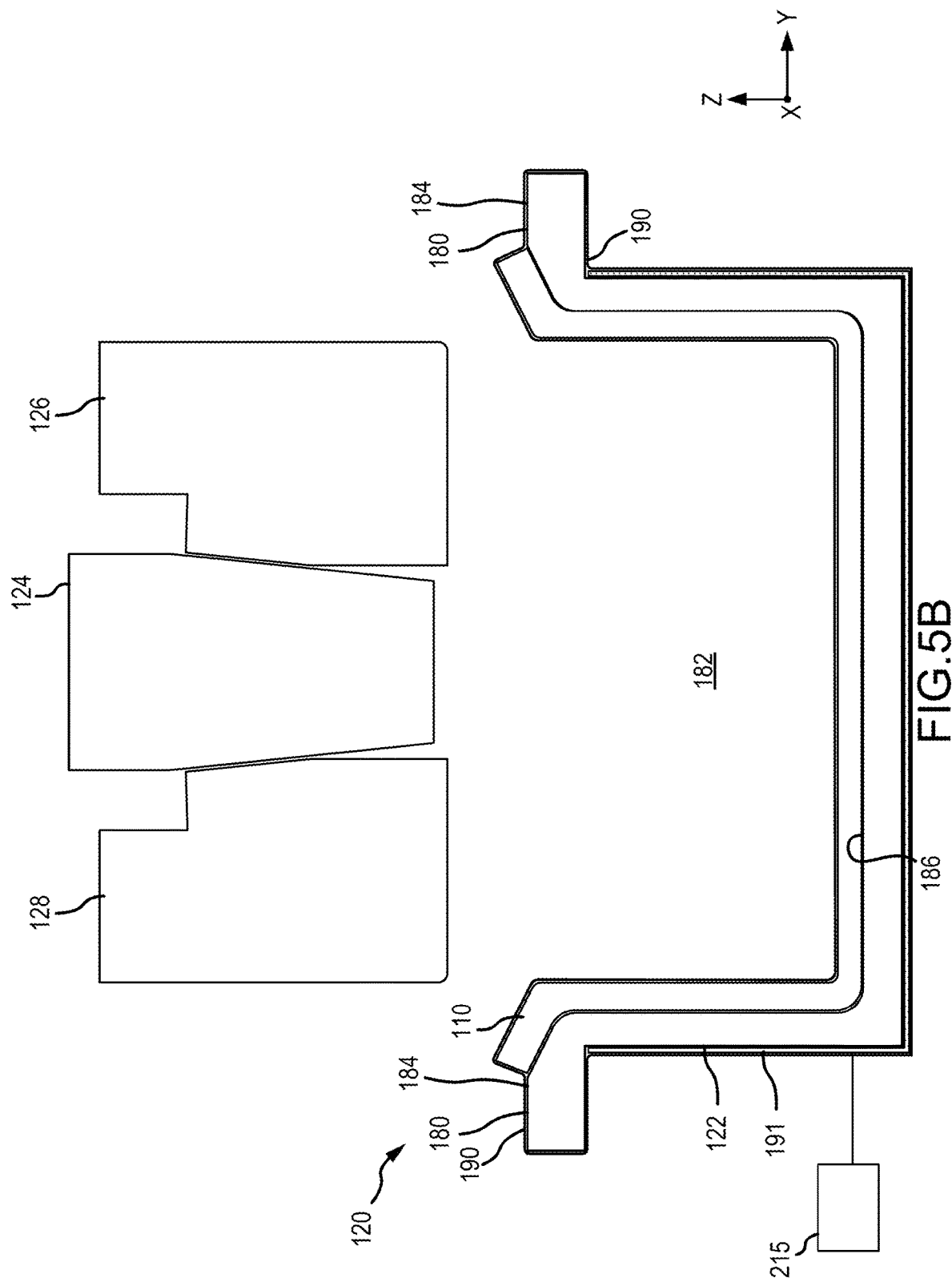
FIG. 5B is a schematic sectional view of the shape forming system of FIG. 5A after air is evacuated from within the vacuum bag, in accordance with various embodiments.

With reference to FIG. 4 the female forming tool 122 extends longitudinally along a longitudinal centerline 106 of the female forming tool 122 (e.g., along X-axis) between and to a first end 170 of the female forming tool 122 and a second end 172 of the female forming tool 122. The female forming tool 122 extends laterally (e.g., along a Y-axis) between and to a first side 174 of the female forming tool 122 and a second side 176 of the female forming tool 122. The female forming tool 122 extends vertically (e.g., along a Z-axis) between and to a bottom side 178 of the female forming tool 122 and a top side 180 of the female forming tool 122.

The female forming tool 122 is configured with at least one die recess 182; e.g., an aperture such as a pocket, a channel, a groove, etc. The die recess 182 of FIG. 4 extends (e.g., partially) vertically into the female forming tool 122 from one or more top surfaces 184 of the female forming tool 122 to a recess surface 186 of the female forming tool 122, where the top surfaces 184 of FIG. 4 are arranged on opposing sides of the recess surface 186 at the female forming tool top side 180. The die recess 182 of FIG. 4 extends longitudinally in (e.g., through) the female forming tool 122, for example, between and to the female forming tool first end 170 and/or the female forming tool second end 172. The die recess 182 of FIG. 4 extends laterally in (e.g., within) the female forming tool 122, for example, between opposing lateral sides of the recess surface 186.

The recess surface 186 is a concave or concave-convex surface and may have a curved geometry; e.g., a three-dimensional (3D) curvature. The recess surface 186 of FIG. 4, for example, has a curved (e.g., arcuate, splined, etc.) cross-sectional geometry in a lateral-vertical reference plane; e.g., a Y-Z plane. The recess surface 186 of FIG. 4 also has a curved (e.g., arcuate, splined, etc.) cross-sectional geometry in a longitudinal-vertical reference plane; e.g., a X-Z plane. This recess curvature may change as the recess surface 186/the die recess 182 extends laterally and/or longitudinally, which may provide the recess surface 186 with a complex 3D curvature. In embodiments, the recess curvature may remain uniform as the recess surface 186/the die recess 182 extends laterally and/or longitudinally. The recess surface 186 may be configured without any sharp corners or sharp transitions, for example that might otherwise damage or create leaks in the vacuum bag material.

In various embodiments, the recess surface 186 comprises a radii surface 181 which forms a rounded, convex surface transition between a sidewall portion 185 of the recess surface 186 and the female forming tool top surface 184. The fibrous preform may be bent around or over radii surface 625. Radii surface 181 may minimize wrinkling of the fibrous preform 110 during the forming process. Radii surface 181 may extend between and to the female forming tool first end 170 and the female forming tool second end 172. In various embodiments, an angled surface 183 oriented at an angle (e.g., between 5 and 40 degrees) with respect to the female forming tool top surface 184 is disposed between the radii surface 181 and the female forming tool top surface 184. Angled surface 183 may extend between and to the female forming tool first end 170 and the female forming tool second end 172.

With reference to FIG. 5A, the fibrous preform 110 may comprise a generally planar preform and may be placed over the female forming tool 122. A vacuum bag 190 may be placed over the fibrous preform 110 and sealed to the female forming tool 122 or completely enclosing the forming assembly (i.e., enclosing the fibrous preform 110 and the female forming tool 122) to compress the fibrous preform 110 therebetween, thereby providing shaping and compressing to the fibrous preform 110. Vacuum bag 190 may at least partially surround female forming tool 122 in the installed position. Moreover, the wedge 124, first plug 126, and second plug 128 are moveable with respect to the female forming tool 122 to further compress the fibrous preform 110 therebetween, thereby providing additional shaping and compressing to the fibrous preform 110, particularly during the carbonization processes.

Methods for manufacturing a C/C part of the present disclosure include pre-carbonization compression of fibrous preform 110. Fibrous preform 110 may comprise polyacrylonitrile (PAN) or OPF fibers extending in three directions and leaving a plurality of pores or open spaces and may be prepared for shape-forming, compression, and carbonization. In various embodiments, fibrous preform 110 is formed by stacking layers of PAN or OPF fibers and superimposing the layers (e.g., by stacking sheets of fabric). The layers may be needled perpendicularly to each other (i.e., along the Z-direction) with barbed, textile needles or barbless, structuring needles. In various embodiments, the layers are needled at an angle of between 0° and 60° (e.g., 0°, 30°, 45°, and/or 60°) with respect to the Z-direction to each other. The needling process generates a series of z-fibers through fibrous preform 110 that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack of layers is formed. The needles may also penetrate through only a portion of fibrous preform 110, or may penetrate through the entire fibrous preform 110. In addition, resins are added, in various embodiments, to fibrous preform 110 by either injecting the resin into the preform following construction or coating the fibers or layers prior to forming the fibrous preform 110. The needling process may take into account needling parameters optimized to maintain fiber orientation, minimize in-plane fiber damage, and maintain target interlaminar properties.

After needling the fibrous preform 110, the non-woven fibrous preform 110 may be both compressed to higher fiber volume and formed to shape in a single-step, shape-forming process (i.e., using the shape forming tool of the present disclosure). It should be understood, moreover, that fibrous preforms 110 not subject to needling prior to pre-carbonization compression are also within the scope of the present disclosure.

After the fibrous preform 110 is placed over the female forming tool 122, the vacuum bag 190 is placed over the fibrous preform 110. In various embodiments, the vacuum bag 190 is made from a mylar material; though any flexible, thin film material capable of burning away during carbonization is within the scope of the present disclosure. In various embodiments, the fibrous preform 110 is pressed down into the die recess 182 (e.g., by hand or using a tool, such as wedge 124, first plug 126, and/or second plug 128) prior to the vacuum bag 190 being installed over the fibrous preform 110 and/or female forming tool 122 to start the shape forming. In various embodiments, a breather cloth 191 is placed between the vacuum bag 190 and the female forming tool 122 to promote air evacuation. In various embodiments, the vacuum bag 190 completely encapsulates the female forming tool 122; however the vacuum bag 190 may also only partially cover the female forming tool 122 (e.g., may encapsulate at least the forming surface of the female forming tool 122). A pump 215 (see FIG. 5B) may be fluidly coupled to the vacuum bag 190 for evacuating air from between the vacuum bag 190 and the female forming tool 122, thereby compressing and shaping the fibrous preform 110 between the vacuum bag 190 and the female forming tool 122. The fibrous preform 110 is shape formed to the geometry of the recess surface 186 of the female forming tool 122 in response to the air being evacuated from between the vacuum bag 190 and the female forming tool 122 as the fibrous preform is pressed into the female forming tool 122.

After vacuum forming the fibrous preform 110 with the vacuum bag (see FIG. 5B), the wedge 124, first plug 126, and second plug 128 are placed over the fibrous preform 110 (and vacuum bag 190) and into the female forming tool 122, thereby further providing additional shaping and compressing of the fibrous preform 110 (see FIG. 1A). In various embodiments, the wedge 124, first plug 126, and second plug 128 are placed over the fibrous preform 110 (and vacuum bag 190) during the vacuum forming.

Figure 7:
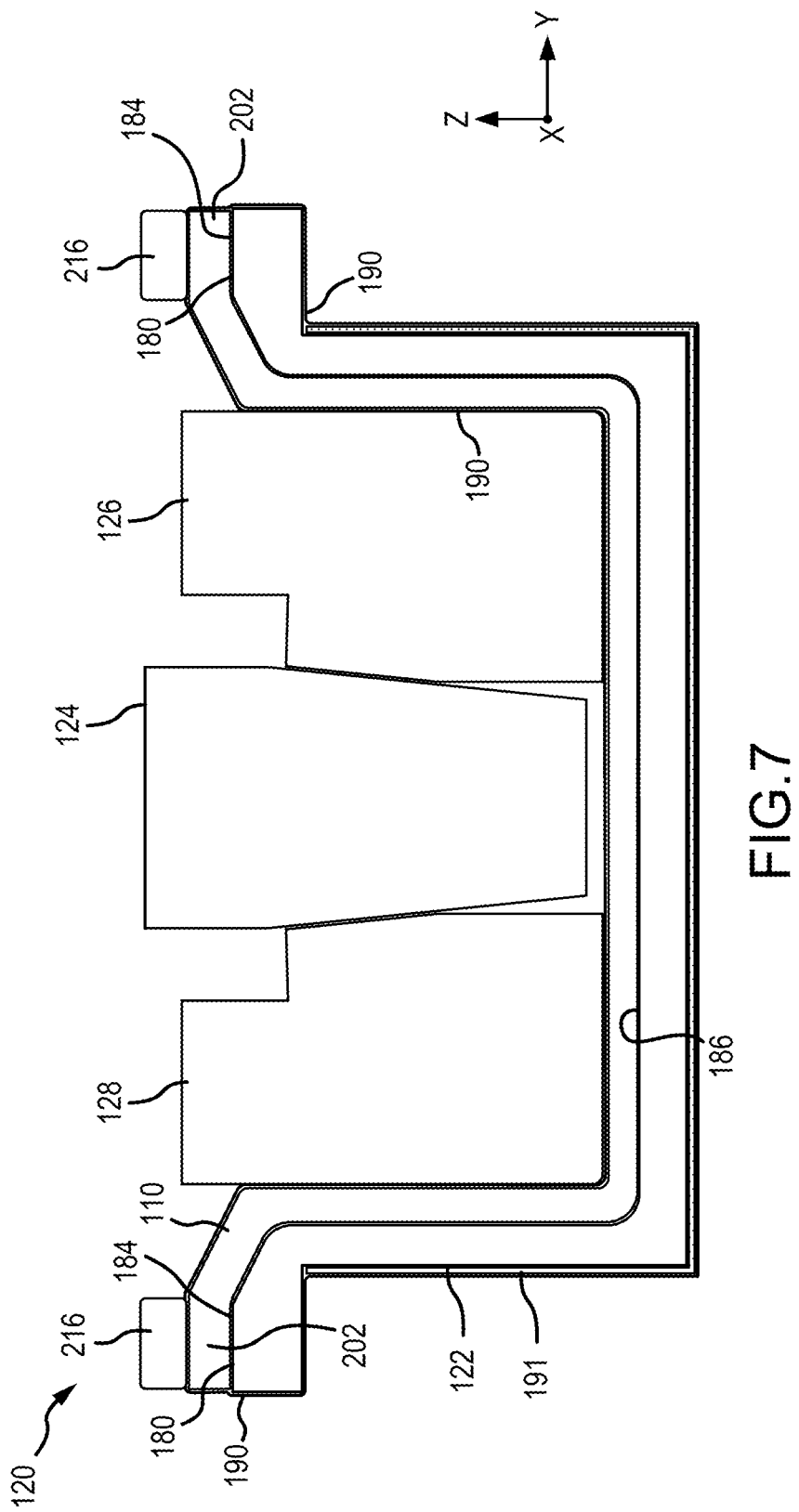
FIG. 7 is a schematic sectional view of a shape forming system with its dead weights resting on opposing lateral ends of the fibrous preform, in accordance with various embodiments.

With reference to FIG. 7, dead weights 216 may be provided for clamping or compressing the opposing lateral ends 202 of fibrous preform 110 to the female forming tool. Dead weights 216 may aid in securing the opposing lateral ends 202 of fibrous preform 110 from moving toward recess surface 186 during the carbonization process. Dead weights 216 may comprise a graphite material.

Figure 8B:
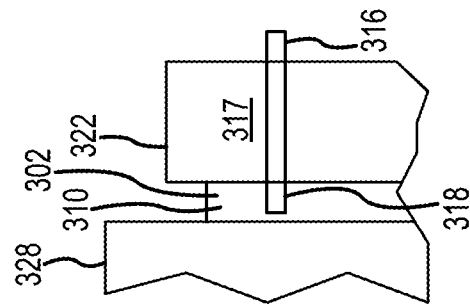
FIG. 8B is a schematic sectional view a dowel of FIG. 8A securing a lateral end of the fibrous preform and extending through a dowel slot in the female tool, in accordance with various embodiments.
Figure 8A:
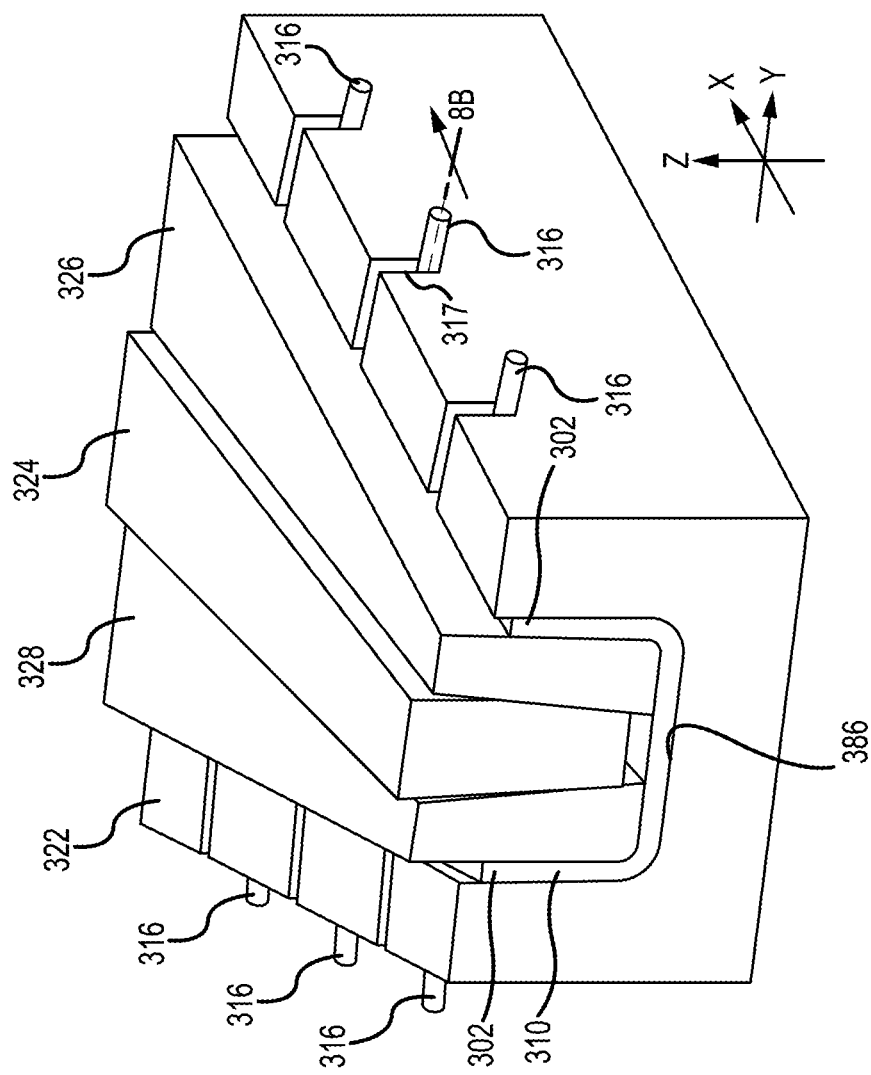
FIG. 8A is a schematic perspective view of a shape forming system with dowels securing opposing lateral ends of a fibrous preform from moving with respect to the female tool, in accordance with various embodiments.

With reference to FIG. 8A and FIG. 8B, a shape forming tool 320 (also referred to as a fixture) for compressing and shaping a fibrous preform 310 is illustrated having dowels 316 for securing the opposing lateral ends 302 of fibrous preform 110 from moving toward recess surface 386 during the carbonization process. The vacuum bag is omitted in FIG. 12A and FIG. 12B for ease of illustration; however, it should be understood that, in use, a vacuum bag would be located between the fibrous preform 310 and the male dies (i.e., wedge 324, first plug 326, and/or second plug 328), similar to that of FIG. 1A. Dowels 316 may comprise a graphite material or a carbon-carbon material, in accordance with various embodiments. In FIG. 8A and FIG. 8B, the vacuum bag is omitted for clarity purposes; or alternatively FIG. 8A and FIG. 8B illustrate the shape forming tool 320 after the vacuum bag has been burned away during the carbonization process. Shape forming tool 320 may be functionally similar to shape forming tool 120. Shape forming tool 320 may comprise a female forming tool 322, a wedge 324, a first plug 326, and a second plug 328. Female forming tool may comprises slots 317 configured to receive the dowels 316. Moreover, the opposing lateral ends 302 of fibrous preform 310 may be configured with at least one dowel recess 318; e.g., an aperture such as a pocket, a channel, a groove, etc. Dowel 316 may be received into the dowel recess 318 whereby the lateral end 302 is secured from vertical movement (e.g., along the Z-axis) during the carbonization process. In various embodiments, dowels 316 and dowel recesses 317 may similarly be provided in any of the other disclose shape forming tools of the present disclosure, such as shape forming tool 120 (see FIG. 1A) for example.

Figure 9:
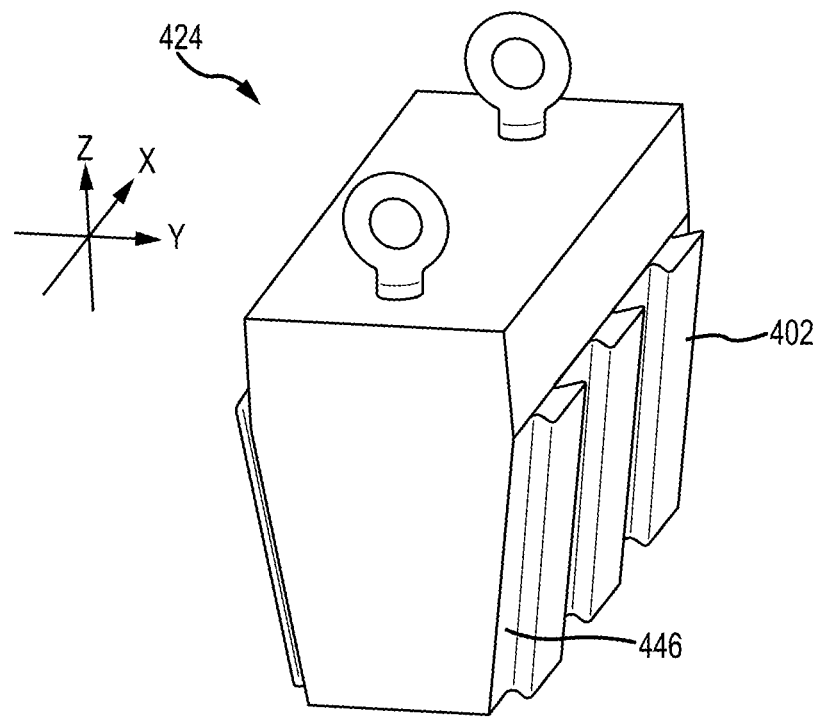
FIG. 9 is a perspective illustration of a wedge having guide bosses, in accordance with various embodiments.
Figure 10:
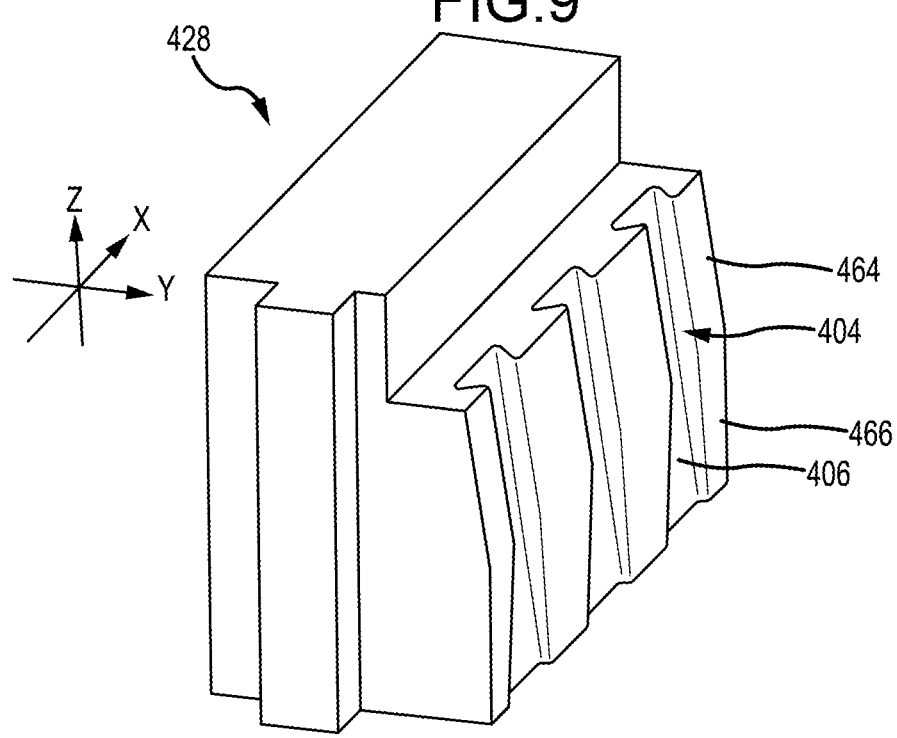
FIG. 10 is a perspective illustration of a plug having guide slots, in accordance with various embodiments.

With reference to FIG. 9, a wedge 424 is illustrated, in accordance with various embodiments. Wedge 424 may be similar to wedge 124 (see FIG. 2) except that wedge 424 comprises vertically oriented guide flanges 402. With additional reference to FIG. 10, a second plug 428 is illustrated, in accordance with various embodiments. Second plug 428 may be similar to second plug 128 (see FIG. 3) except that second plug 428 comprises vertically oriented guide slots 404. In various embodiments, wedge 424 comprises one or more vertically oriented guide flanges 402 and second plug 428 comprises one or more vertically oriented guide slots 404. Each guide flange 402 is shaped and sized to be received by a respective guide slot 404. Each guide flange 402 may protrude from the angled surface 446. In this manner, wedge 424 may be mechanically locked from longitudinal movement (e.g., along the X-direction) with respect to second plug 428. Stated differently, the guide slot 404 is configured to receive the guide flange 402 for maintaining a longitudinal position of the second plug 428 with respect to the wedge 424.

In various embodiments, guide flanges 402 may comprise a tapered geometry such that the guide flange 402 becomes wider as it extends further from the second angled surface 446. Guide flange 402 (and guide slot 404) may be shaped like a dovetail. In this manner, wedge 424 may be mechanically locked from lateral movement (e.g., along the Y-direction) with respect to the second plug 428. Moreover, the guide flanges 402 and guide slots 404 provide rotational alignment (e.g., about the X-axis) of the second plug 428 with respect to wedge 424 (i.e., to keep the plug(s) from tipping over and rotating either clockwise (for the RH plug) or counterclockwise (for the LH plug), with momentary reference to FIG. 8A. However, guide flanges 402 may be non-tapered or may be tapered such that the guide flange 402 becomes narrower as it extends further from the second angled surface 446, such that the wedge 424 is free—as to the guide flange 402—to move laterally away from the second plug 428.

Guide slot 404 may extend across the angled surface 464 and the vertical surface 466. The back surface 406 of the guide slot 404 may be a linear surface along the direction of travel of the guide flanges 402 with respect to the second plug 428.

Figure 11:
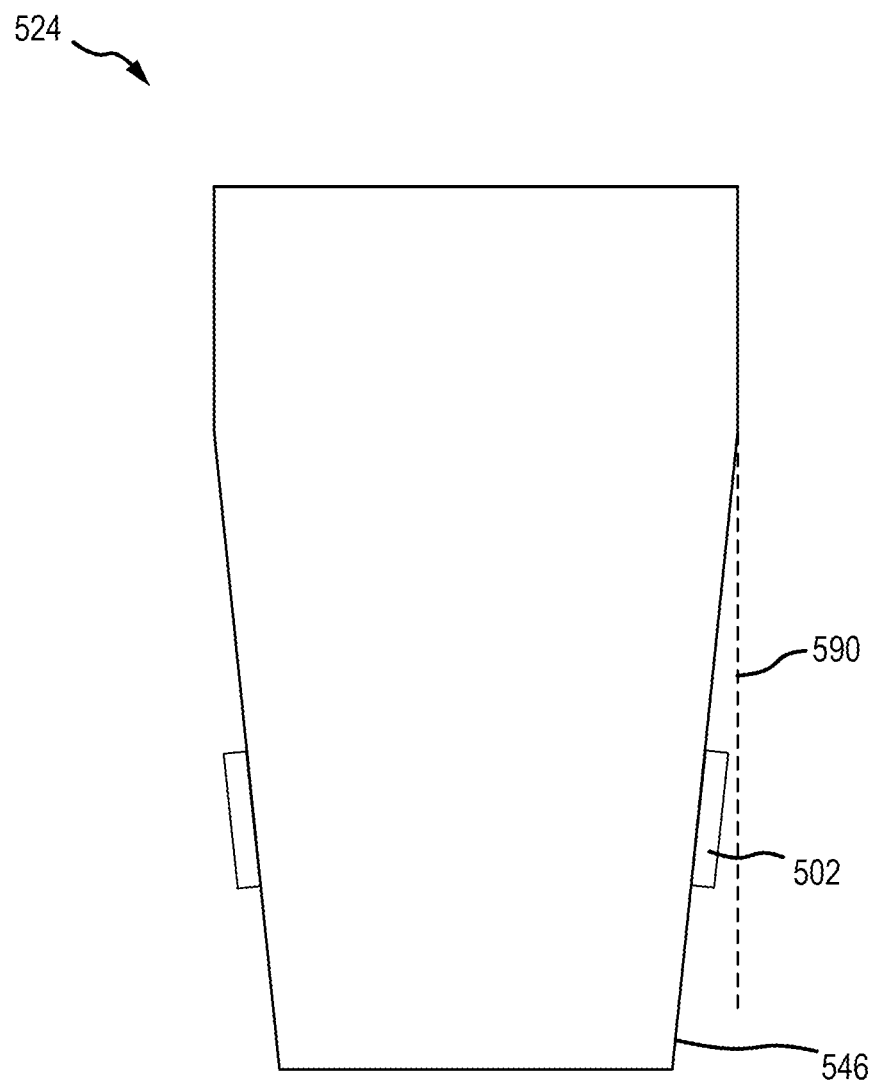
FIG. 11 is a schematic sectional illustration of a wedge having guide bosses disposed within the outermost periphery or boundary of the wedge, in accordance with various embodiments.

With reference to FIG. 11, a guide flange 502 for a wedge 524 is illustrated, in accordance with various embodiments. Guide flange 502 may be positioned, sized, and shaped so as to not extend laterally beyond the laterally outermost surface 150 of the wedge 524. FIG. 11 illustrates the laterally outermost boundary 590 with a dashed line and the guide flange 502 within said boundary. In this manner, the likelihood of the wedge 524 being snagged by the guide flange 502 as it is installed between the first plug and second plug is reduced. Stated differently, the likelihood of the guide flange 502 undesirably contacting the first plug or second plug during installation or disassembly is reduced.

Figure 12A:
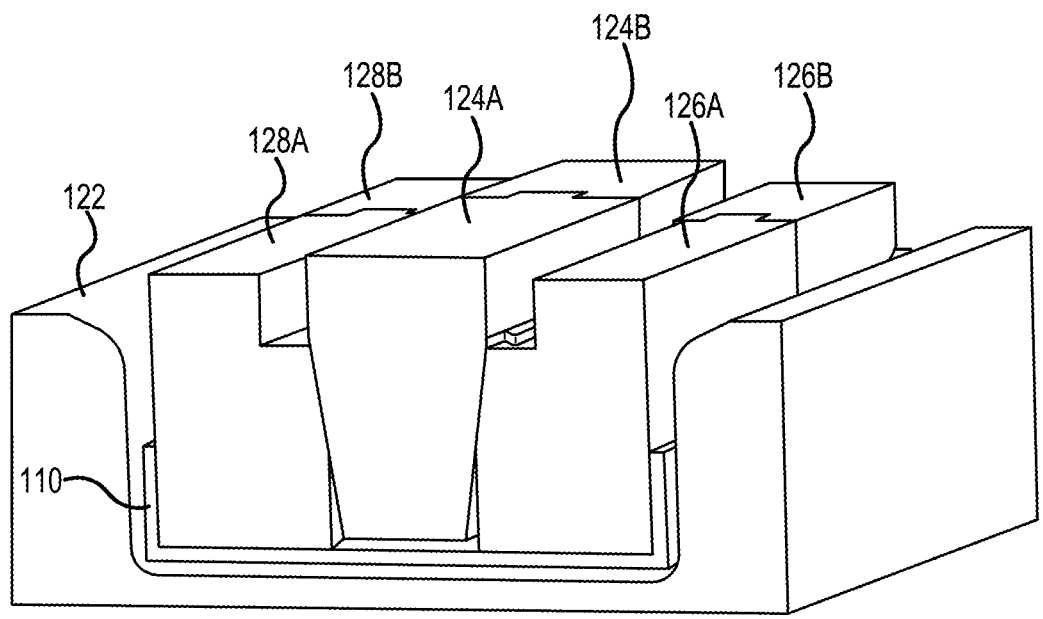
FIG. 12A and FIG. 12B are perspective illustrations opposing ends of a shape forming system having a wedge having wedge sub-units, a first plug having first plug sub-units, and a second plug having second plug sub-units, in accordance with various embodiments.
Figure 12B:
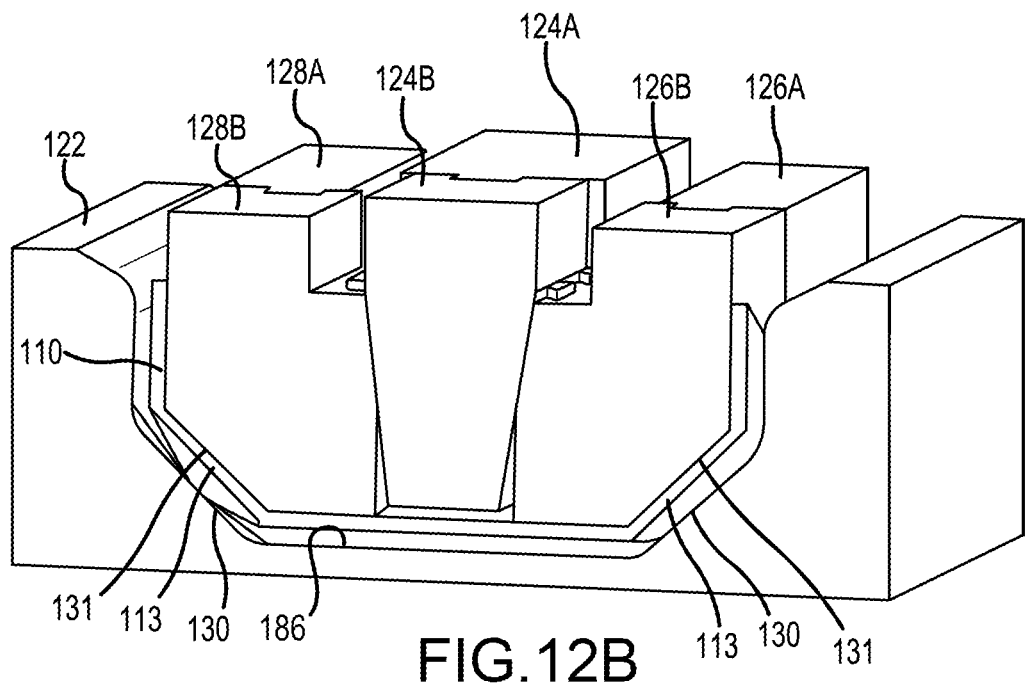

With reference to FIG. 12A and FIG. 12B, the wedge 124, first plug 126, and/or second plug 128 may be arranged in one or more arrays longitudinally disposed adjacent from each neighboring wedge 124, first plug 126, and/or second plug 128, respectively, in the same array. The vacuum bag is omitted in FIG. 12A and FIG. 12B for ease of illustration; however, it should be understood that, in use, a vacuum bag would be located between the fibrous preform 110 and the male dies (i.e., wedge 124, first plug 126, and/or second plug 128), similar to that of FIG. 1A. For example, the wedge (referred to generally as wedge 124) may comprise a first wedge sub-unit 124A and a second wedge sub-unit 124B. The first plug (referred to generally as first plug 126) may comprise a first plug sub-unit 126A and a second plug sub-unit 126B. The second plug (referred to generally as second plug 128) may comprise a third plug sub-unit 128A and a fourth plug sub-unit 128B. In various embodiments, the sub-units of an array (e.g., wedge sub-units, first plug sub-units, and/or second plug sub-units) may be interlocked with one another using tongue and groove joints, or the like, to maintain alignment of adjacent sub-units and even compression along the longitudinal length of the fibrous preform 110. In various embodiments, each sub-unit may comprise a different geometry to conform to the geometry of the female forming tool 122. Moreover, by providing a plurality of sub-units, each sub-unit may be separately installed, which may increase ease of installation for longitudinally lengthy arrays (as opposed to installing a single, more lengthy unit).

In various embodiments, with reference to FIG. 12B, female forming tool 122 may comprise one or more lifted corners 130 at least partially defining the recess surface 186. The lifted corner 130 may extend from a sidewall of the female forming tool 122 to a bottom wall of the female forming tool 122. One or more of the first plug 126 and/or the second plug 128 may comprise a corresponding cutout or beveled corner 131 shaped to be complementary to the lifted corner 130. In this manner, the fibrous OPF preform 110 may be formed to have a similarly shaped contour or lifted corner 113.

Figure 13:
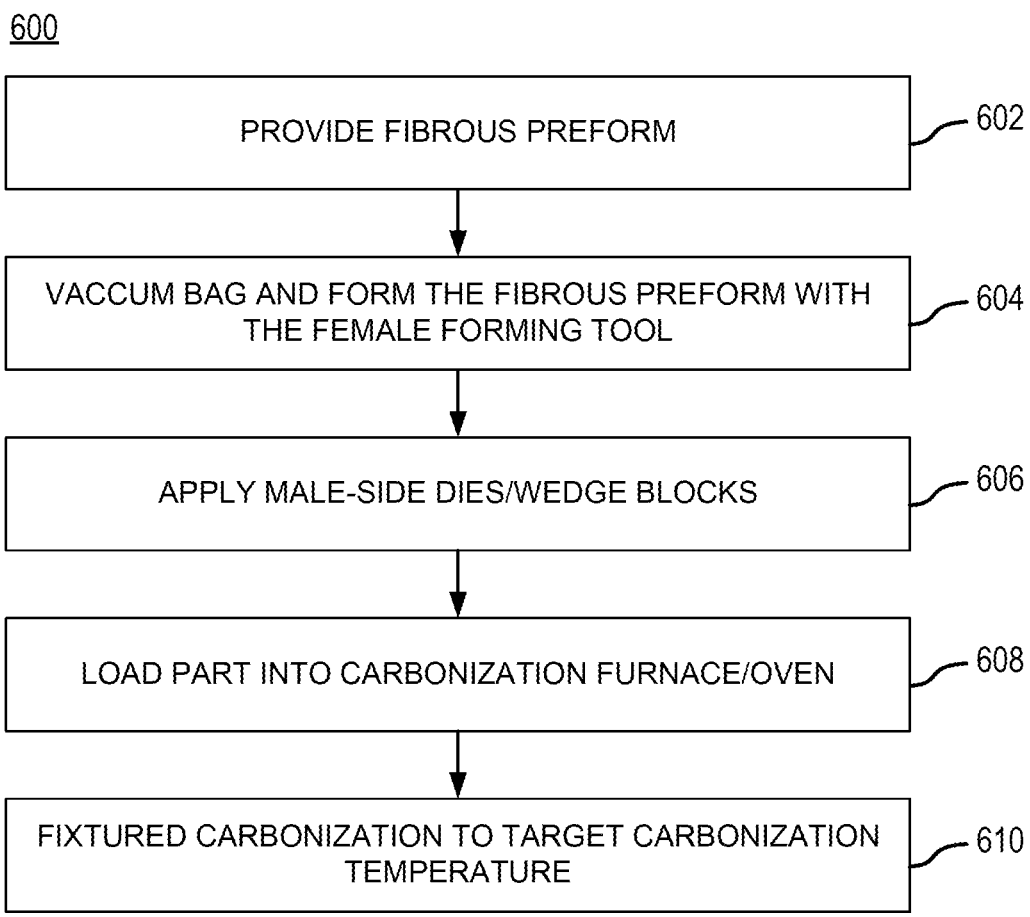
FIG. 13 is a flow diagram of a method for forming a preform into shaped body.

With reference to FIG. 13, a flow diagram of a method 600 for forming a fibrous OPF preform 110 into a shaped body is provided, in accordance with various embodiments. For ease of description, the method 600 is described below with reference to FIG. 1A, FIG. 1B, FIG. 5A, FIG. 5B, FIG. 6, FIG. 7, and FIG. 8. The method 600 of the present disclosure, however, is not limited to use of the exemplary shape forming tools of FIG. 1A, FIG. 1B, FIG. 5A, FIG. 5B, FIG. 6, FIG. 7, and FIG. 8.

In step 602, the fibrous preform 110 is provided. Fibrous preform 110 may be configured as a multi-layered preform. Each layer of material may share a common (e.g., the same) construction and/or material makeup. Each layer of material, for example, may be formed by a sheet/layer of fibrous material; e.g., non-woven oxidized polyacrylonitrile (PAN) fibers. However, one or more layers of dissimilar construction may also be included (e.g., a non-woven with a chopped fiber mat sacrificial material).

In step 604, the fibrous preform 110 is arranged with the female forming tool 122. The fibrous preform 110 is disposed on the female forming tool 122 at its top side 180 (see FIG. 5A). The bottom layer of the fibrous preform 110 may engage (e.g., vertically contacts, is abutted against, lays flush on, etc.) the female forming tool top surfaces 184. The vacuum bag 190 is sealed to or around the female forming tool 122 and air is evacuated from within the vacuum bag 190 to shape form the fibrous preform 110 to the female forming tool 122 (see FIG. 5B). In this manner, the fibrous preform 110 may be pushed down to the bottom of the recess surface 186 of the female forming tool 122 (see FIG. 5B) (e.g., by vacuum pressure).

In various embodiments, moisture is added to the fibrous preform 110 prior to being vacuum bagged. For example, a sizing agent comprising a fluid and/or fluid vapor such as water, polyvinyl alcohol, and/or steam may be applied to the fibrous preform 110 (e.g., before being shape formed). Adding the sizing agent (e.g., polyvinyl alcohol, water, and/or steam) to the fibrous preform 110 may dampen the fibers thereof which tends to relax the fibers of the fibrous preform thereby aiding in the bending, forming, and/or stretching of the fibrous preform. Sizing may help to protect the fiber from handling damage and provide lubricity allowing the fibers to slide easily during preforming/compaction and aid in preventing wrinkling and kinking. Sizing agents of the present disclosure include water soluble polymers. The sizing agent may comprise a water solution. The sizing agent and may comprise long chain alcohols such as polyvinyl alcohols, modified starch, cellulose gum such as carboxymethyl cellulose, modified wax, acrylates, and/or mixtures thereof. In various embodiments, approximately 1 milliliter (ml) of water may be added for every 2.5 cubic inches of fibrous preform (1 ml/2.5 in3), wherein the term approximately as used in this context can only mean±0.5 ml. Stated differently, between 0.5 ml and 1.5 ml of water may be added to the fibrous preform for every 2.5 cubic inches of fibrous preform. However, it should be understood that other amounts of water may be added to the fibrous preform without departing from the scope of the present disclosure. Moreover, the fibrous preform may be preconditioned in a humidity chamber at a humidifying temperature (e.g., between 100° F. (37.8° C.) and 200° F. (93.3° C.)) and a relative humidity (e.g., between 75% and 90% humidity). Adding water and/or steam to the fibrous preform 110 may tend to reduce wrinkling of the fibrous preform 110 and support stabilizing the preform into the desired shape. In this manner, the fibrous preform 110 may be compressed to higher fiber volume and formed to shape using heat, moisture, and pressure into contoured shapes using tool 120 as desired for a particular C/C part application.

The dead weight(s) 216 of FIG. 7 may be disposed along a periphery of the fibrous preform 110, in various embodiments. The dowels 316 of FIG. 8A may be disposed along a periphery of the fibrous preform 110, in various embodiments.

In various embodiments, heat is added to the fibrous preform 110 during the shape forming process. For example, tool 120 may be heated whereby heat is conducted from the tool 120 into the fibrous preform 110. In various embodiments, it is further contemplated that heaters, separate from the tool 120, may be provided for heating the fibrous preform 110 during the shape-forming process. In various embodiments, components of the shape forming tool 120 may be heated in an oven prior to being introduced to the fibrous preform 110, for example to a shape forming temperature of between 150° F. and 400° F. (65° C.-205° C.) in various embodiments, between 200° F. and 350° F. (93° C.-177° C.) in various embodiments, between 200° F. and 300° F. (93° C.-149° C.) in various embodiments, and between 225° F. and 275° F. (107° C.-135° C.) in various embodiments. In various embodiments, the fibrous preform is heated to the shape forming temperature for a duration of between an hour and 24 hours.

In the arrangement of FIG. 5A, the fibrous preform 110 may have a planar configuration. Prior to forming the shaped body 116, for example, the fibrous preform 110 may be configured as a flat plate. Of course, in other embodiments, one or more of the layers of material of the fibrous preform 110 may slightly bend (e.g., droop) into the die recess 182.

In step 606, wedge 124, first plug 126, and second plug 128 may move (e.g., downward) vertically from the (e.g., open) position of FIG. 5A to the (e.g., closed or partially closed) position of FIG. 1A. In various embodiments, the first plug 126 and second plug 128 are moved downward to rest on the vacuum bag 190 and the wedge 124 is then moved downward to fit between the first plug 126 and second plug 128. In various embodiments, the first plug 126, second plug 128, and wedge may be moved downward simultaneously. As the first plug 126 and second plug 128 move (e.g., simultaneously or each individually), the first plug 126 and second plug 128 vertically apply a load to a portion of the fibrous preform 110 that overlaps (e.g., spans laterally and longitudinally across) the die recess 182. More particularly, the bottom side 160 vertically presses against fibrous preform (with the vacuum bag sandwiched therebetween). With the wedge 124, first plug 126, and second plug 128 installed over the fibrous preform and at least partially within the die recess 182 (e.g., see FIG. 1A), the wedge 124 may be further moved (e.g., downward) vertically with respect to the female forming tool 122 (see FIG. 1B). Wedge 124 may be moved vertically using an apparatus 115, such as a dead weight, or the like. As the wedge 124 continues to vertically move to its (e.g., closed) position of FIG. 1B, the wedge transmits a compressing force 192 into the first plug 126 and the second plug 128. For example, with particular focus on the second plug, the compressing force 192 is transmitted via first angled surface 144 of wedge 124 and angled surface 164 of second plug 128, thereby causing the second plug 128 to move in the lateral direction (e.g., along the Y-axis) to compress (e.g., see compression forces represented by arrows 194 in FIG. 1A) a sidewall 118 of the fibrous preform 110 and also causing the second plug 128 to move (e.g., downward) in the vertical direction (e.g., along the Z-axis) to compress (e.g., see compression forces represented by arrows 196 in FIG. 1A) a bottom wall 117 of the fibrous preform 110. Although described with respect to second plug 128, it should be understood that wedge 124 similarly engages first plug 126 (e.g., with similar forces mirrored about the Z-axis). As the wedge 124 continues to vertically move to its (e.g., closed) position of FIG. 1B, the first plug 126 and second plug 128 (and in various embodiments the wedge 124) collectively compress and reinforce the shape of the fibrous preform 110 to conform to (e.g., take the shape of) the recess surface 186. The fibrous preform 110 and its stack of the layers of material, more particularly, are further press formed (e.g., stamped)—in addition to the vacuum forming or the maintain a shape achieved by vacuum forming—into the shaped body 116 between the wedge 124, first plug 126, second plug 128 and the recess surface 186 of female forming tool 122. Stated differently, pressing wedge 124 between and against the first plug and the second plug in a first direction (e.g., the negative Z-direction) causes the first plug 126 and the second plug to move in a second direction (e.g., along the Y-axis) substantially perpendicular to the first direction. Pressing wedge 124 between and against the first plug and the second plug in the first direction (e.g., the negative Z-direction) may further cause the first plug 126 and the second plug to move in the first direction, thereby compressing the bottom wall 117.

As the wedge 124 continues to vertically move to its (e.g., closed) position of FIG. 1B, the top side 142 may eventually become flush with the top sides of first plug 126 and second plug 128. When the top side 142 is flush with the top sides of first plug 126 and second plug 128, the apparatus 115 may contact to top sides of first plug 126 and second plug 128 (in addition to the top side 142 of wedge 124) and simultaneously move all three of wedge 124, first plug 126, and second plug 128. In this manner, the bottom sides of all three of wedge 124, first plug 126, and second plug 128 may be simultaneously pressed against the vacuum bag 190 (or the fibrous preform 110 if the vacuum bag has already burned away during carbonization) thereby transmitting a compressive force to the fibrous preform 110, thereby shaping and compressing the fibrous preform into the shaped body 116. In this regard, total vertical dimensions (e.g., a height; i.e., along the Z-axis) of the wedge 124, the first plug 126, and the second plug 128 may be the same. In various embodiments, three discrete apparatus 115 may be provided to press each of wedge 124, first plug 126, and second plug 128, respectively. In various embodiments, apparatus 115 and dead weight 216 (see FIG. 7) may both comprise a dead weight. In various embodiments, apparatus 115 and dead weight 216 may be the same dead weight.

Moreover, as the wedge 124 continues to vertically move to its (e.g., closed) position, the first plug 126 and the second plug 128 may be moved laterally outward (see FIG. 1B) to accommodate the increasing width of the wedge 124, thereby compressing and shaping the sidewalls 118 of the fibrous preform into the shaped body 116.

Shape forming tool 120 may form the fibrous preform 110 into the shaped body 116 comprising a final, or near final, shape of the desired C/C part. In various embodiments, the shaped body 116 comprises a U-shape cross-sectional geometry (e.g., in the Y-Z plane). In various embodiments, the shaped body 116 comprises a complex curvature, depending on the geometry of the recess surface 186 of the female forming tool 122. With reference to FIG. 1B, shaped body 116 including a sidewall 118 bent at an angle α with respect to a bottom wall 117 is illustrated, in accordance with various embodiments. In various embodiments, angle α is between one degree and one hundred and seventy-nine degrees (1°-179°), between thirty degrees and one hundred and seventy degrees)(30°-170°, between thirty degrees and one hundred and twenty degrees)(30°-120°, between forty-five degrees and one hundred and seventy degrees)(45°-170°, between sixty degrees and one hundred and seventy degrees (60°-170°), between ninety degrees and one hundred and seventy degrees)(90°-170°, between thirty degrees and one hundred and seventy degrees)(30°-170°, between eighty degrees and one hundred degrees)(80°-100°, or about ninety degrees (90°). The angle α is generally chosen based on the shape of the desired C/C part.

The shape forming tool 120 and its components 122, 124, 126, 128 are described above using the terms "bottom" and "top" with reference to exemplary orientations in the drawings. The present disclosure, however, is not limited to any particular formation system orientations. For example, in other embodiments, the wedge 124, first plug 126, and second plug 128 may alternatively be configured as a bottom die and the female forming tool 122 may alternatively be configured as a top die.

In step 608, the fixtured shape-formed fibrous preform 110 (i.e., shape forming tool 120 together with shaped body 116) may be carbonized by placing the shape-formed fibrous preform 110 in a furnace with an inert atmosphere. In step 610 the carbonization oven or furnace is turned on (i.e., heat is generated) to heat the shaped body to a desired carbonization temperature. In various embodiments, the carbonization process involves heating the shape-formed fibrous preform 110 in a furnace to a temperature greater than about 1,200 degrees Celsius (2,912 Fahrenheit). The carbonization temperature may be between about 1,200 degrees Celsius (2,912 Fahrenheit) and about 2,400 degrees Celsius (4,352 Fahrenheit). In various embodiments, the carbonization process involves heating the shape-formed fibrous preform 110 in a furnace to a temperature greater than about 1,600 degrees Celsius (2,912 Fahrenheit). Typically, an inert atmosphere of nitrogen, argon or a vacuum is provided in the furnace during the carbonization process. The heat of the furnace causes a chemical conversion of the OPF that converts the fibers to carbon fibers and drives off other chemicals. Although it is sometimes preferred that the fibers in the carbonized fiber preform be 100% carbon fiber, it is generally acceptable for a less than full conversion to take place. The resulting carbonized fiber preform generally has the same fibrous structure as the fibrous preform before carbonizing. During carbonization, the total mass and the total fiber volume in each fibrous preform is typically reduced due to the loss of non-carbon compounds.

Fiber density of the fibrous preform 110 may increase during carbonization (e.g., from about 1.37 g/cc in OPF state to about 1.77-1.85 g/cc after carbonization, depending on the final carbonization temperature). In various embodiments, the OPF fibers shrink during carbonization, as OPF may have a char/carbon yield of around 50%. As used herein "char/carbon yield" means the remaining mass of the OPF after degrading the OPF using the carbonization process.

The vacuum bag 190 may be burned away (e.g., incinerated) during carbonization, wherein the female forming tool 122, wedge 124, first plug 126, and second plug 128 are configured to maintain the compressed shape of the shaped body 116 during the carbonization process. For example, shaped body 116 may be held in compression by placing the dead weight (e.g., apparatus 115) onto wedge 124, first plug 126, and/or second plug 128 to evenly apply compressive forces onto shaped body 116. In this manner, gravitational forces and the dead weight may hold shaped body 116 in compression between wedge 124, first plug 126, and/or second plug 128 and female forming tool 122. Moreover, because wedge 124, first plug 126, and second plug 128 are non-rigidly coupled to the female forming tool 122, and gravitational forces pull graphite wedge 124, first plug 126, and second plug 128 toward forming tool 122 (i.e., in the negative Z-direction in FIG. 1B), the shape forming tool 120 is configured to accommodate shrinkage and further compression of shaped body 116 during carbonization. In this regard, as shaped body 116 shrinks during carbonization, the gap between wedge 124, first plug 126, and/or second plug 128 and female forming tool 122 may decrease due to the apparatus 115 biasing wedge 124 toward female forming tool 122. In this manner, the shape of shaped body 116 is maintained and the shrinkage of the shaped body 116 is further accommodated. In various embodiments, wedge 124, first plug 626, and second plug 128 are not in direct contact with female forming tool 122. Stops may also be used during the carbonization process to control the carbonized preform thickness and fiber volume to the target level.

In various embodiments, the shape forming tool 120 is designed such that the wedge 124 sits up (i.e., proud of or protruding above the plugs 126, 128) at the beginning of carbonization. During carbonization, the fibrous preform 110 will shrink (e.g., decrease in thickness). As this shrinkage is occurring, the influence of the apparatus 115 on the wedge 124 will drive the wedge 124 and plug 126, 128 down and out (laterally toward the female forming tool sidewalls) to continue to apply pressure to the fibrous preform 110.

In various embodiments, apparatus 115 may additionally or alternatively comprise a hydraulic load (e.g., a hydraulic press). In this manner, a hydraulic load may be applied to bias the wedge 124 toward the female forming tool 122 during carbonization. As used herein, the term "external load" may refer to a dead weight and/or a hydraulic load.

The carbonization process may be employed to convert the fibers of the shaped body 116 into pure carbon fibers, as used herein only "pure carbon fibers" means carbon fibers comprised of at least 99% carbon. The carbonization process is distinguished from the densification process described below in that the densification process involves infiltrating the pores of the shaped body 116 and depositing a carbon matrix within and around the carbon fibers of the shaped body 116, and the carbonization process refers to the process of converting the fibers of the shaped body 116 into pure carbon fibers.

After carbonization, the carbonized shaped body 116 may be densified using chemical vapor infiltration (CVI), as described in further detail below. In various embodiments, the shaped body 116 is removed from graphite fixture 620 prior to densification. In various embodiments, the shaped body 116 is placed in a perforated graphite fixture during one or more densification runs. The shaped body 116 may be densified with pyrolytic carbon by CVI using optimized process conditions to maintain shape and support efficient carbon densification. In general, densification involves filling the voids, or pores, of the fibrous preform with additional carbon material. This may be done using the same furnace used for carbonization or a different furnace. Typically, chemical vapor infiltration and deposition ("CVI/CVD") techniques are used to densify the porous fibrous preform with a carbon matrix. This commonly involves heating the furnace and the carbonized preforms, and flowing hydrocarbon gases (e.g., at least one of methane, ethane, propane, butane, and/or the like, as described herein) into the furnace and around and through the fibrous preforms. In various embodiments, the CVI/CVD process may include a temperature gradient. In various embodiments, the CVI/CVD process may include a pressure gradient. In various embodiments, the CVI/CVD process may include a temperature and a pressure gradient.

CVI/CVD densification may be conducted in a vacuum or partial vacuum (e.g., at pressures of 1-15 torr) or in an inert atmosphere at a temperature in the range from about 900° C. to about 1100° C. (1,652° F. to about 2,012° F.), and in various embodiments in the range of up to about 1,000° C. (1,832° F.) (wherein the term about in this context only means +/−100° C.) for a period of time in the range from about 150 hours to about 650 hours, and in various embodiments, in the range from about 300 hours to about 500 hours (wherein the term about in this context only means +/−24 hours).

As a result, carbon from the hydrocarbon gases separates from the gases and is deposited on and within the fibrous preforms. Typically, the densification process is continued until the preform reaches a density in the range from 1.6 to 1.9 grams per cubic centimeter (g/cc), and in various embodiments, a density of approximately 1.80 g/cc. When the densification step is completed, the resulting C/C part has a carbon fiber structure with a carbon matrix infiltrating the fiber structure, thereby deriving the name "carbon/carbon."

After a first CVI/CVD cycle of 300 to 500 hours, an intermediate heat treat is typically performed, in the same furnace. This heat treat (>1600° C.) serves to dimensionally stabilize the shaped body 116, increase its thermal properties, and increase its porosity for subsequent densification. The shaped body 116 may then be machined to open the porosity further, to help allow for final density to be achieved using only one more CVI/CVD cycle. Part densities after first machining may be in the range of 1.4 to 1.7 g/cc, depending on the part thickness, overall size, and placement within the furnace. Typical, average density range is 1.55-1.65 g/cc.

The densification process may be continued until the preform reaches a desired density, for example in the range from 1.7 to 1.9 grams per cubic centimeter (g/cc), and in various embodiments, a density of approximately 1.80 g/cc. The CVI/CVD process may be continued with the shaped body 116 removed from the perforated graphite fixture. In this manner, the outer surfaces of the shaped body 116 may be more directly exposed to the gas flow. Moreover, the shaped body 116 may be machined in between carbon CVI densification processes (e.g., between fixtured carbon CVI densification and non-fixtured carbon CVI densification and/or between successive non-fixtured carbon CVI densification processes). Machining (e.g., grinding, sanding, milling, grit blasting, etc.) the shaped body 116 may be performed to achieve a final desired part shape. Machining the shaped body 116 may be performed to expose voids, or pores, of the shaped body 116 so as to facilitate infiltration with additional carbon material during subsequent carbon CVI densification. When the densification step is completed, and the desired density is achieved, the resulting C/C part has a carbon fiber structure with a carbon matrix infiltrating the fiber structure, thereby deriving the name "carbon/carbon."

Following the CVI/CVD densification process, the C/C part may undergo a final heat treatment (FHT) process. This may be done using the same furnace used for densification or a different furnace. If done using the same furnace, the flow of hydrocarbon gases would be stopped following the end of the densification process and the temperature increased. FHT may be conducted in a vacuum or partial vacuum (e.g., at pressures of 1-15 torr) or in an inert atmosphere at a temperature in the range from about 1200° C. to about 2600° C. (2,192° F. to about 4,712° F.), and in various embodiments in the range from about 1400° C. to about 2200° C. (2,552° F. to about 3,992° F.) (wherein the term about in this context only means +/−100° C.) for a period of time in the range from about 4 hours to about 14 hours, and in various embodiments, in the range from about 8 hours to about 12 hours (wherein the term about in this context only means +/−2 hours). In various embodiments, the FHT process imparts high temperature dimensional stability to the final C/C part. In various embodiments, the FHT process imparts desired thermal properties associated with thermal shock such as high thermal conductivity, high heat capacity, and/or high emissivity.

Figure 14A:
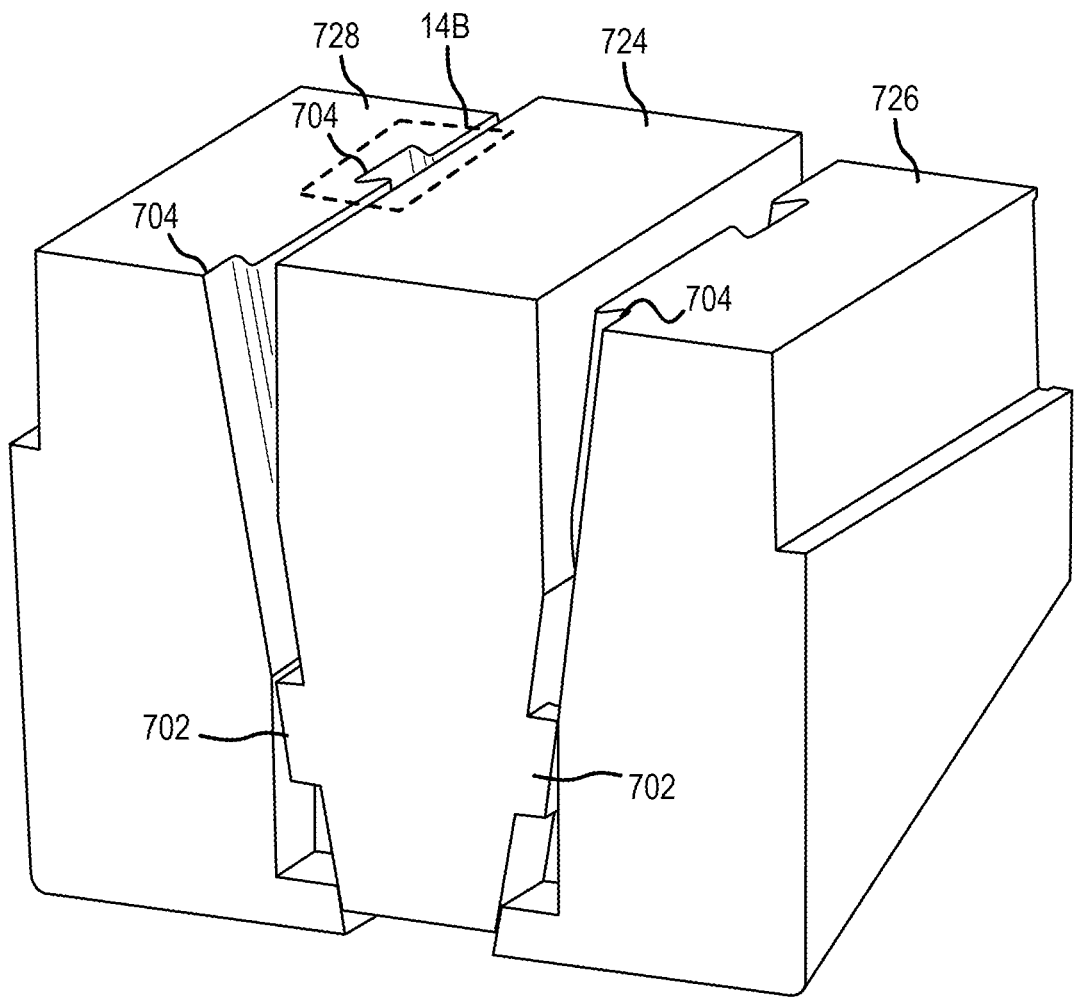
FIG. 14A is a perspective illustrations of a wedge, a first plug, and a second plug in an installed position, in accordance with various embodiments.
Figure 15:
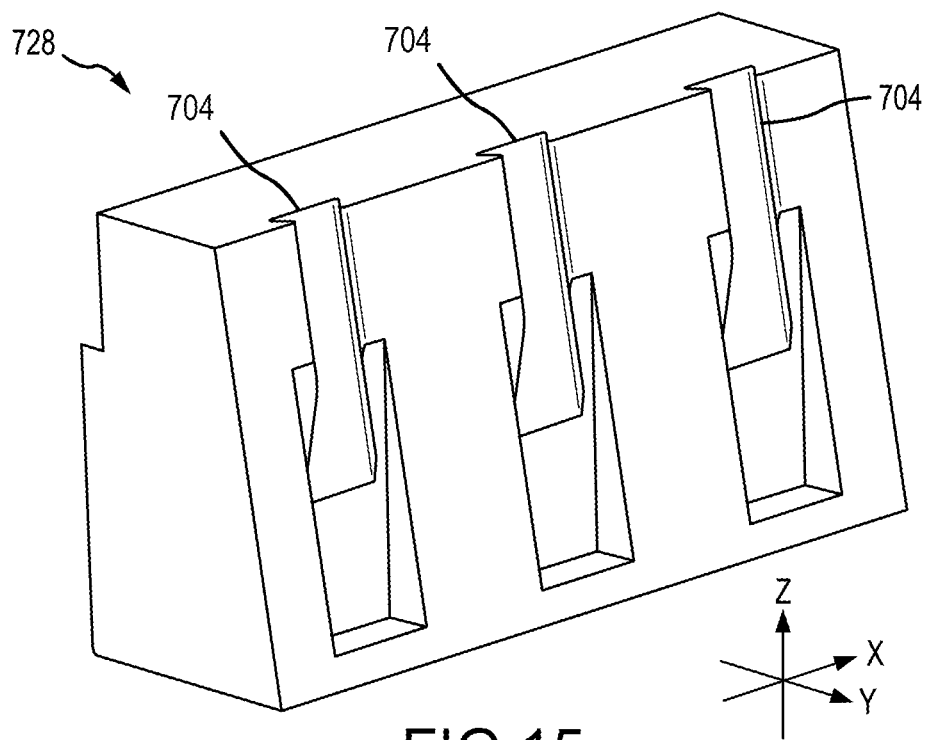
FIG. 15 is a perspective illustration of a plug (the first plug or the second plug) of FIG. 14A, in accordance with various embodiments.
Figure 16:
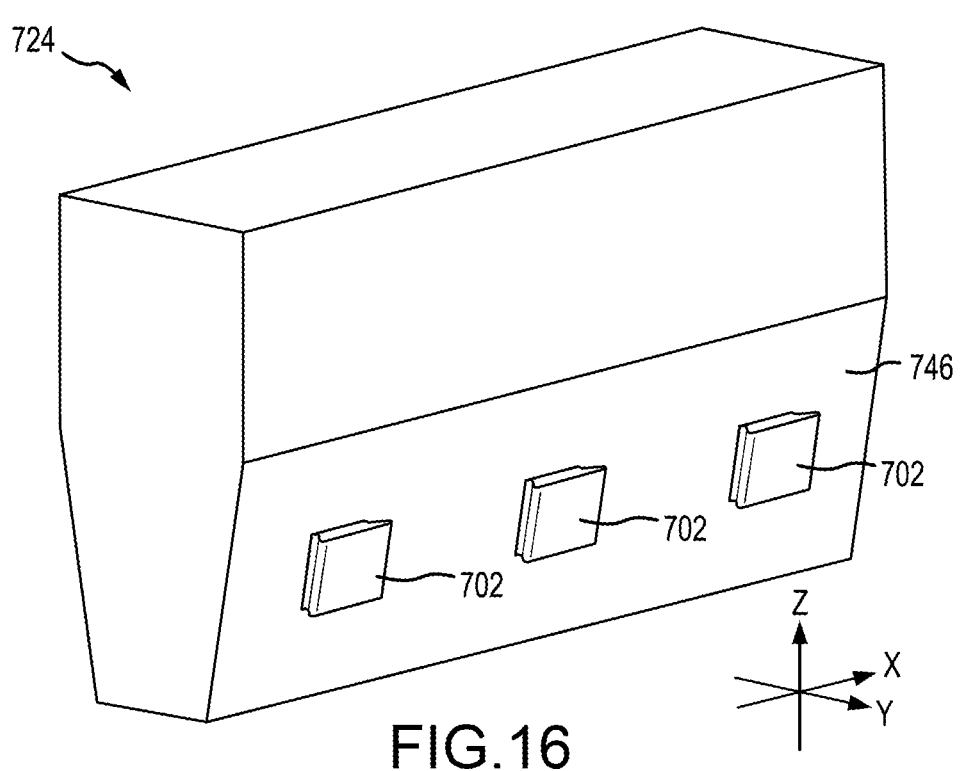
FIG. 16 is a perspective illustration of the wedge of FIG. 14A, in accordance with various embodiments.

With reference to FIG. 14A, a perspective section view of a wedge 724, a first plug 726, and a second plug 728 are illustrated, in accordance with various embodiments. In various embodiments, wedge 724, first plug 726, and second plug 728 are structurally and functionally similar to wedge 624, first plug 626, and second plug 628 of FIG. 6. With additional reference to FIG. 15 and FIG. 16, wedge 724 comprises one or more guide flanges 702 and second plug 728 comprises one or more guide slots 704. Each guide flange 702 is shaped and sized to be received by a respective guide slot 704. Each guide flange 702 may protrude from angled surface 746. In this manner, wedge 724 may be mechanically locked from longitudinal movement (e.g., along the X-direction) with respect to second plug 728. Stated differently, the guide slot 704 is configured to receive the guide flange 702 for maintaining a longitudinal position of the second plug 728 with respect to the wedge 724. Moreover, the guide flange 702 and guide slot 704 provide rotational alignment (e.g., about the X-axis) of the second plug 728 with respect to wedge 724 (i.e., to keep the plug(s) from tipping over and rotating either clockwise (for the RH plug) or counterclockwise (for the LH plug) as viewed in FIG. 14A.

Figure 14B:
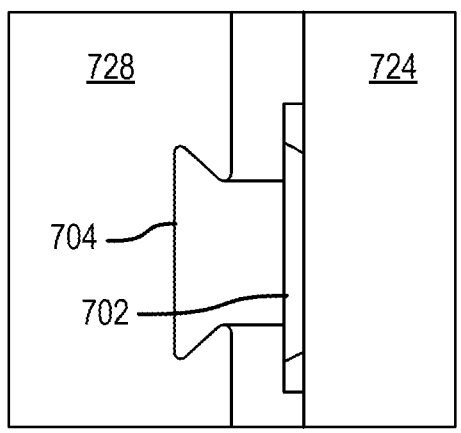
FIG. 14B is a top view of the guide slot of the second plug and the guide flange of the wedge of FIG. 14A, in accordance with various embodiments.

With reference to FIG. 14B, a top view of a portion of wedge 724 and a portion of second plug 728 is illustrated with the wedge 724 and second plug 728 in a closed or partially closed position is illustrated, in accordance with various embodiments. In various embodiments, as the wedge 724 slides downward with respect to second plug 728 (and first plug 726), the guide flange 702 may slide past and out of the guide slot 704 to facilitate disassembly of the wedge 724 from first plug 726 and second plug 728.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for manufacturing a C/C part, the method comprising:
   positioning an oxidized PAN fiber preform with a female forming tool, the female forming tool comprising a die recess;
   positioning a vacuum bag over the oxidized PAN fiber preform;
   forming the oxidized PAN fiber preform into a shaped body;
   loading the female forming tool and the shaped body into a carbonization furnace; and
   carbonizing the shaped body with the carbonization furnace, and the vacuum bag is burned away in the carbonization furnace during the carbonizing;
   wherein the forming step comprises:
      evacuating air from between the vacuum bag and the female forming tool to press the oxidized PAN fiber preform against the die recess of the female forming tool with the vacuum bag.

2. The method of claim 1, wherein the forming further comprises:
   moving a first plug at least partially into the die recess and over the vacuum bag, the oxidized PAN fiber preform disposed between the first plug and the female forming tool;
   moving a second plug at least partially into the die recess and over the vacuum bag, the oxidized PAN fiber preform disposed between the second plug and the female forming tool;
   moving a wedge between and against the first plug and the second plug along a first axis;
   in response to the wedge pressing between and against the first plug and the second plug, moving the first plug and the second plug along a second axis substantially perpendicular to the first axis; and
   in response to the moving the first plug and the second plug along the second axis, compressing the oxidized PAN fiber preform and the vacuum bag between the first plug and the female forming tool and between the second plug and the female forming tool.

3. The method of claim 2, wherein the movement of the wedge along the first axis further causes the first plug and the second plug to move parallel to the first axis.

4. The method of claim 1, further comprising:
   positioning a dowel at least partially into a dowel recess disposed in the oxidized PAN fiber preform;
   positioning the dowel at least partially into a slot disposed in the female forming tool to secure at least a portion of the oxidized PAN fiber preform with respect to the female forming tool.

5. The method of claim 1, further comprising compressing a lateral end of the oxidized PAN fiber preform between an external load and a top side of the female forming tool.

6. The method of claim 1, further comprising applying water to the oxidized PAN fiber preform.

7. The method of claim 1, wherein the carbonizing the shaped body with the carbonization furnace comprises heating the oxidized PAN fiber preform in the carbonization furnace to a carbonization temperature of between 1,200° C. and 2,400° C. (2,732° F. to 4,352° F.).

8. A method for manufacturing a C/C part, the method comprising:
   positioning an oxidized PAN fiber preform with a female forming tool, the female forming tool comprising a die recess;
   positioning a vacuum bag over the oxidized PAN fiber preform;
   forming the oxidized PAN fiber preform into a shaped body by evacuating air from between the vacuum bag and the female forming tool to press the oxidized PAN fiber preform against the female forming tool with the vacuum bag;
   moving a first plug at least partially into the die recess and over the vacuum bag, the oxidized PAN fiber preform disposed between the first plug and the female forming tool;
   moving a second plug at least partially into the die recess and over the vacuum bag, the oxidized PAN fiber preform disposed between the second plug and the female forming tool;
   moving a wedge between and against the first plug and the second plug along a first axis;
   loading the female forming tool and the shaped body into a carbonization furnace;
   placing an external load on top of the wedge, the external load biasing the wedge toward the female forming tool; and
   carbonizing the shaped body with the carbonization furnace, and the vacuum bag is burned away in the carbonization furnace during the carbonizing.

9. The method of claim 8, wherein the vacuum bag completely encapsulates the female forming tool.

\* \* \* \* \*